US010970028B2

(12) United States Patent
Lee et al.

(10) Patent No.: US 10,970,028 B2
(45) Date of Patent: Apr. 6, 2021

(54) DATA PROCESSING METHOD AND ELECTRONIC APPARATUS THEREFOR

(71) Applicant: SAMSUNG ELECTRONICS CO., LTD., Suwon-si (KR)

(72) Inventors: Joonyoung Lee, Suwon-si (KR); Namhyun Kim, Suwon-si (KR); Jinjoo Chung, Suwon-si (KR); Doochan Hwang, Suwon-si (KR); Minho Kim, Suwon-si (KR); Junghyun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/242,741

(22) Filed: Jan. 8, 2019

(65) Prior Publication Data

US 2019/0212966 A1  Jul. 11, 2019

(30) Foreign Application Priority Data

Jan. 9, 2018 (KR) .................. 10-2018-0002991

(51) Int. Cl.
*G06F 3/14* (2006.01)
*H04B 10/116* (2013.01)
(Continued)

(52) U.S. Cl.
CPC .......... *G06F 3/1454* (2013.01); *G09G 5/006* (2013.01); *G09G 5/12* (2013.01); *H04B 10/116* (2013.01);
(Continued)

(58) Field of Classification Search
CPC ........ G06F 3/1454; G09G 5/12; G09G 5/006; H04B 10/116; H04B 10/1141;
(Continued)

(56) References Cited

U.S. PATENT DOCUMENTS 8,982,037 B2   3/2015  Lee et al.
9,031,376 B2 * 5/2015  Ann ................... H04N 21/8133
                                                        386/230
(Continued)

FOREIGN PATENT DOCUMENTS

JP     2016-100626 A   5/2016
KR  10-2015-0006705 A   1/2015
(Continued)

OTHER PUBLICATIONS

Communication dated Apr. 8, 2019, issued by International Searching Authority in counterpart International Application No. PCT/KR2019/000234 (PCT/ISA/220, 210, & 237).
(Continued)

*Primary Examiner* — Grant Sitta
(74) *Attorney, Agent, or Firm* — Sughrue Mion, PLLC

(57) ABSTRACT

An electronic apparatus includes a receiver configured to receive data output through a screen of an external display, a memory storing one or more instructions, and a controller including at least one processor configured to execute the one or more instructions stored in the memory, wherein, based on the external display outputting an image corresponding to content, the controller is configured to obtain data that is output through the image, the data including first data including information associated with the content, obtain network connection information for connecting to a network associated with the content based on the first data, and control, by using the network connection information, at least one of the electronic apparatus and an external electronic apparatus, to be connected to the network.

20 Claims, 14 Drawing Sheets

(51) Int. Cl.
  *H04L 29/08* (2006.01)
  *H04B 10/114* (2013.01)
  *G09G 5/12* (2006.01)
  *G09G 5/00* (2006.01)
  *H04N 21/81* (2011.01)
  *H04N 21/41* (2011.01)
(52) U.S. Cl.
  CPC ........ *H04B 10/1141* (2013.01); *H04L 67/141* (2013.01); *H04N 21/4126* (2013.01); *H04N 21/812* (2013.01)
(58) Field of Classification Search
  CPC .. H04B 10/114; H04L 67/141; H04N 21/812; H04N 21/4126
  See application file for complete search history.

(56) References Cited

U.S. PATENT DOCUMENTS

| | | | | |
|---|---|---|---|---|
| 9,136,945 | B2* | 9/2015 | Lee | H04B 10/116 |
| 9,794,965 | B1* | 10/2017 | Yu | H04W 76/10 |
| 9,825,702 | B2 | 11/2017 | Cha | |
| 10,425,520 | B2* | 9/2019 | Kim | H04L 12/4625 |
| 10,484,100 | B2* | 11/2019 | Peng | G08C 17/02 |
| 10,594,680 | B2* | 3/2020 | Sethi | H04B 10/1149 |
| 2006/0195902 | A1* | 8/2006 | King | G06Q 20/1235 |
| | | | | 726/21 |
| 2008/0136621 | A1* | 6/2008 | Malik | H04W 48/14 |
| | | | | 340/539.1 |
| 2009/0175594 | A1* | 7/2009 | Ann | H04N 21/23412 |
| | | | | 386/357 |
| 2011/0018754 | A1* | 1/2011 | Tojima | G08C 23/04 |
| | | | | 341/176 |
| 2011/0063510 | A1 | 3/2011 | Lee et al. | |
| 2011/0119745 | A1* | 5/2011 | Bremner | H04L 63/0853 |
| | | | | 726/7 |
| 2012/0207441 | A1* | 8/2012 | Hymel | G06Q 99/00 |
| | | | | 386/230 |
| 2012/0208462 | A1* | 8/2012 | Lee | H04W 8/005 |
| | | | | 455/41.2 |
| 2013/0027423 | A1* | 1/2013 | Bae | G09G 3/3413 |
| | | | | 345/619 |
| 2013/0152168 | A1* | 6/2013 | Nasir | H04W 12/08 |
| | | | | 726/4 |
| 2013/0157687 | A1* | 6/2013 | Mori | H04W 48/20 |
| | | | | 455/456.1 |
| 2013/0330088 | A1* | 12/2013 | Oshima | H04N 5/232 |
| | | | | 398/130 |
| 2014/0023378 | A1* | 1/2014 | Bae | G06Q 30/02 |
| | | | | 398/128 |
| 2014/0025795 | A1* | 1/2014 | Fiennnes | H04N 21/4182 |
| | | | | 709/222 |
| 2014/0057676 | A1* | 2/2014 | Lord | H04B 10/116 |
| | | | | 455/556.1 |
| 2014/0086590 | A1* | 3/2014 | Ganick | H04W 12/06 |
| | | | | 398/118 |
| 2014/0093254 | A1* | 4/2014 | Gotou | H04B 10/63 |
| | | | | 398/203 |
| 2014/0094143 | A1* | 4/2014 | Ayotte | H04W 4/80 |
| | | | | 455/411 |
| 2014/0186047 | A1* | 7/2014 | Oshima | H04N 5/2353 |
| | | | | 398/118 |
| 2014/0364056 | A1* | 12/2014 | Belk | H04B 5/0031 |
| | | | | 455/41.1 |
| 2014/0380443 | A1* | 12/2014 | Stark | H04W 12/003 |
| | | | | 726/7 |
| 2015/0134375 | A1 | 5/2015 | Ogawa | |
| 2015/0223277 | A1* | 8/2015 | Jovicic | H04W 76/14 |
| | | | | 455/41.2 |
| 2015/0327060 | A1* | 11/2015 | Gilson | H04W 76/11 |
| | | | | 726/7 |
| 2016/0035318 | A1* | 2/2016 | Matsukawa | G09G 5/12 |
| | | | | 345/2.3 |
| 2017/0237488 | A1* | 8/2017 | Aoyama | H04B 10/50 |
| | | | | 398/118 |
| 2018/0139202 | A1* | 5/2018 | Sethi | H04L 63/18 |
| 2018/0287700 | A1* | 10/2018 | Gummadi | H04W 4/026 |
| 2019/0297243 | A1* | 9/2019 | Oshima | H04B 10/116 |
| 2020/0007614 | A1* | 1/2020 | Olive | H04L 67/10 |

FOREIGN PATENT DOCUMENTS

| | | |
|---|---|---|
| KR | 10-2016-0114642 A | 10/2016 |
| WO | 2011/137100 A1 | 11/2011 |
| WO | 2015/116420 A1 | 8/2015 |

OTHER PUBLICATIONS

Communication dated Dec. 1, 2020, issued by the European Patent Office in counterpart European Application No. 19738597.4.
Communication dated Feb. 3, 2021, issued by the European Patent Office in counterpart European Application No. 19738597.4.

* cited by examiner

FIG. 1
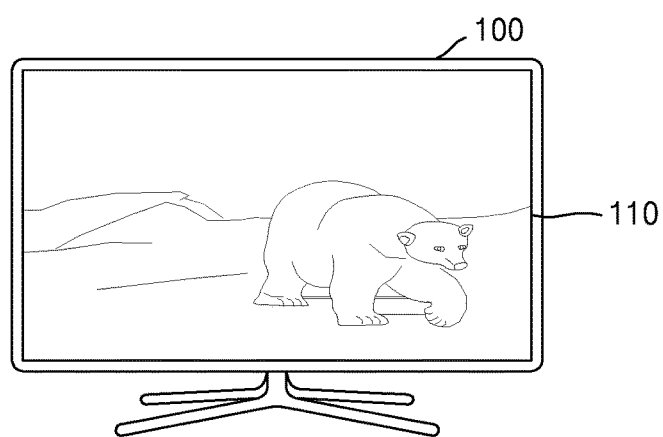
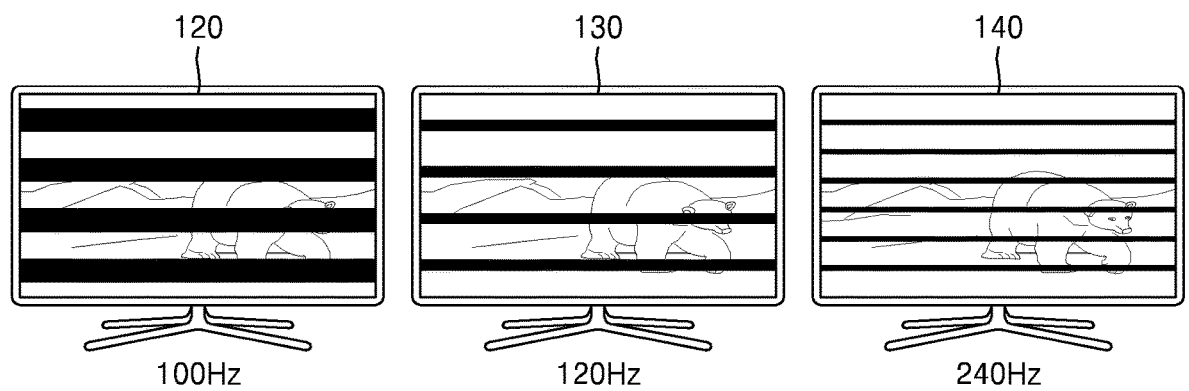
100Hz  120Hz  240Hz

DATA PROCESSING METHOD AND ELECTRONIC APPARATUS THEREFOR

CROSS-REFERENCE TO RELATED APPLICATION

This application is based on and claims priority under 35 U.S.C. § 119 to Korean Patent Application No. 10-2018-0002991, filed on Jan. 9, 2018, in the Korean Intellectual Property Office, the disclosure of which is incorporated by reference herein in its entirety.

BACKGROUND

1. Field

The disclosure relates to a data processing method and an electronic apparatus for the data processing method.

More particularly, the disclosure relates to a data processing method and an electronic apparatus for obtaining data and processing the obtained data to obtain certain information, the data being output through a screen displayed on an external display.

2. Description of Related Art

Due to the supply of displays and the development of technology, visible light communication (VLC) technology, which communicates by using visible light output from a display, has been developed and used.

In this regard, visible light is an electromagnetic wave having a wavelength of 380 nm to 780 nm, and is light that is recognized by the human eye. VLC is a next-generation short distance communication using light having a visible light band, and is a technology for transmitting and receiving data between electronic apparatuses by using at least one of a blink rate and a brightness change of visible light output from a display.

Specifically, VLC refers to a technology in which data is transmitted through, for example, a display capable of expressing a blink or brightness change several tens of times per second, such as a light-emitting diode (LED) or a laser diode (LD), and receiving data transmitted by, for example, a photodiode (PD) or an image sensor. In this regard, the data transmitted and received through VLC may be referred to as 'VLC data'.

VLC may involve transmitting data by using at least one of blinking of light and change in brightness of light on the screen of the display. For example, an LED blinks more than a million times per second. For example, when a display includes an LED array, data corresponding to a case in which an LED array included in the display blinks 120 times per second is set to a value of 0, and data corresponding to a case in which an LED array included in the display blinks 240 times per second is set to a value of 1, binary data may be generated and output by using the LED array. Also, when the brightness change is faster than 40 to 50 times per second, the human eye does not perceive a change in brightness, and therefore the user of the display may perceive that the display is continuously turned on. That is, even without making the eyes of the user be uncomfortable, data is transmitted or received between electronic apparatuses through the VLC.

Also, the VLC enables simultaneous transmission of information to a plurality of electronic apparatuses, and information may be transmitted without a pairing process among a plurality of devices that perform the VLC.

In addition, since information is transmitted only in a place where light is transmitted, it is impossible to generate or hack VLC data in a place where light is not transmitted. Accordingly, the VLC has excellent security performance in regard to the transmission and reception of data.

SUMMARY

Provided are a data processing method that allows a user to have a quick and easy access to a network by using data output through a screen displayed on an external display, and an electronic apparatus for the data processing method.

In details, embodiments of the present disclosure provide a method and electronic apparatus for visible light communication (VLC) data processing, the method and electronic apparatus allowing, when content is regenerated by an external display, the electronic apparatus, which is distinguished from the external display, to have a quick and easy access to a network by using VLC data obtained through a screen of the external display.

Additional aspects will be set forth in part in the description which follows and, in part, will be apparent from the description, or may be learned by practice of the presented embodiments.

In accordance with an aspect of the disclosure, an electronic apparatus may include a receiver configured to receive data output through a screen of an external display, a memory storing one or more instructions, and a controller including at least one processor configured to execute the one or more instructions stored in the memory, wherein, based on the external display outputting an image corresponding to content, the controller is configured to obtain data that is output through the image, the data including first data including information associated with the content, obtain network connection information for connecting to a network associated with the content based on the first data, and control, by using the network connection information, at least one of the electronic apparatus and an external electronic apparatus, to be connected to the network.

The first data may include at least one from among connection information about the content, broadcasting information about the content, characteristics information about the content, service information associated with the content, auxiliary information associated with the content, and connection information about a network associated with the content.

The network connection information may include information for connecting to a server or apparatus which provides, based on the first data, at least one of the content, a service associated with the content, and information associated with the content.

The electronic apparatus may further include a display, and the controller may be further configured to control, by using the network connection information, the content to be displayed on the display.

The electronic apparatus may further include a display, and the controller may be further configured to connect, using the network connection information, to the server or the apparatus which provides the service associated with the content, and may be further configured to control a display window providing the service to be displayed on a portion of the display.

The electronic apparatus may further include a user interface configured to receive a command or information, and the controller may be further configured to receive, via the user interface, a user input of requesting sharing, with the external electronic apparatus, at least one of the content, the service associated with the content, and the information associated with content, and control the network connection information to be transmitted to the external electronic apparatus, in response to the user input.

The controller may be further configured to obtain, based on the network connection information, information associated with content and control a screen including the information associated with content to be displayed on a display.

The electronic apparatus may further include a display, the content may include an advertisement, and the controller may be further configured to obtain, based on the first data, network connection information for connecting to a server or apparatus to provide information or a service corresponding to the advertisement, and to control a display window to be displayed on the display by using the network connection information, the display window providing the information or the service corresponding to the advertisement.

The controller may be further configured to control the network connection information to be transmitted to the external electronic apparatus corresponding to a user using virtual reality (VR) content, to share at least one screen corresponding to the content as the VR content.

The content may include VR content, and the controller may be further configured to control the network connection information to be transmitted to at least one external electronic apparatus corresponding to at least one user using the VR content.

The controller may be further configured to control location information of the electronic apparatus and the network connection information to be transmitted to the external electronic apparatus corresponding to a user using augmented reality (AR) content to share at least one screen corresponding to the content as the AR content.

The first data may include identification information to identify the external display, and the controller may be further configured to control, based on the identification information, pairing to be performed between the electronic apparatus and the external display.

The first data may include visible light communication (VLC) data that is output through a screen of the external display.

In accordance with an aspect of the disclosure, a data processing method includes based on an external display outputting an image corresponding to content, obtaining, by the external display, information associated with the content that is data output through the image, obtaining network connection information for connecting to a network associated with the content based on first data included in the data, and performing, by at least one of an electronic apparatus and an external electronic apparatus, an operation of connecting to the network.

The network connection information may include information for connecting to a server or apparatus which provides at least one of the content, a service associated with the content, and the information associated with content.

The data processing method may further include connecting to the server or the apparatus which provides the content by using the network connection information, receiving data corresponding to the content from the server or apparatus providing the content, and displaying the content on a display of the electronic apparatus.

The data processing method may further include receiving a user input of requesting sharing at least one of the content, a service associated with the content, and information associated with content with the external electronic apparatus, and transmitting the network connection information to the external electronic apparatus, in response to the user input.

The operation of connecting to the network may include transmitting the network connection information to the external electronic apparatus corresponding to a user using virtual reality (VR) content to share at least one screen corresponding to the VR content.

The operation of connecting to the network may include transmitting location information of the electronic apparatus and the network connection information to the external electronic apparatus corresponding to a user using augmented reality (AR) content to share at least one screen corresponding to the content as the AR content.

The first data may include identification information identifying the external display, and the data processing method may further include performing pairing between the electronic apparatus and the external display based on the identification information.

In accordance with an aspect of the disclosure, a data processing method includes detecting an image displayed by an external display, the image including content and data associated with the content, obtaining the data from the image, obtaining network connection information for connecting to a network associated with the content based on the data, and connecting at least one of an electronic apparatus and an external electronic apparatus to the network based on the network connection information.

The content included in the image may be perceptible to a human when the image is displayed on the display, and wherein the data included in the image may be imperceptible to a human when the image is displayed on the display.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 is a view for explaining data output through a screen of a display, according to an embodiment;

DETAILED DESCRIPTION

Figure 2:
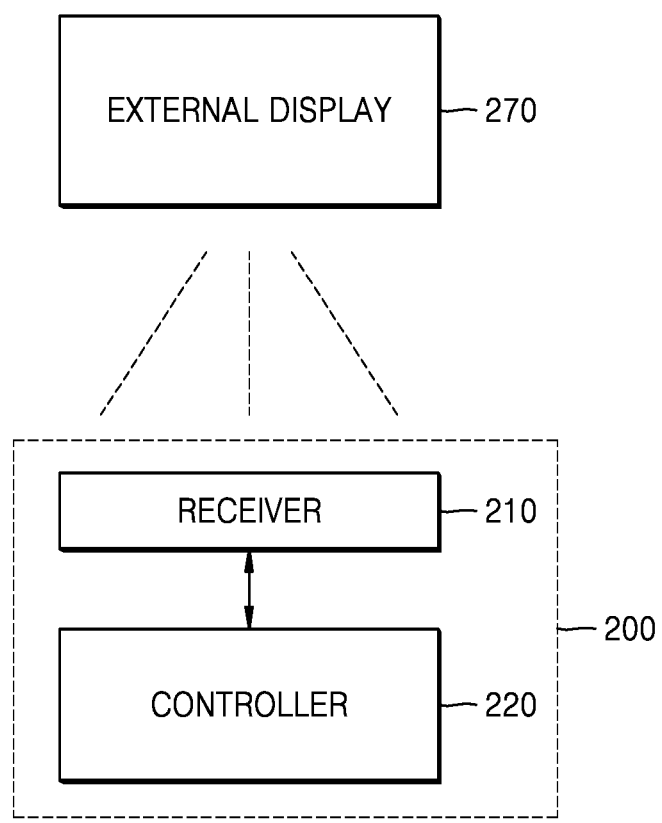
FIG. 2 is a block diagram illustrating an electronic apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the present disclosure will be described in detail with reference to the accompanying drawings so that those skilled in the art can easily carry out the present disclosure. The present disclosure may, however, be embodied in many different forms and should not be construed as limited to the embodiments set forth herein. In order to clearly illustrate the present disclosure, parts not related to the description are omitted, and like parts are denoted by like reference numerals throughout the specification.

Throughout the specification, it will be understood that when an element is referred to as being "connected" to another element, it may be "directly connected" to the other element or "connected to the other element with intervening elements therebetween." When a portion "includes" an element, unless otherwise described, another element may be further included, rather than the presence of other elements being excluded.

The phrases "in one or more embodiments" and "in an embodiment" throughout the present specification do not necessarily all refer to the same embodiment.

One or more embodiments may be represented by functional block configurations and various processing operations. Some or all of these functional blocks may be implemented as various numbers of hardware and/or software configurations that perform particular functions. For example, the functional blocks according to the present disclosure may be implemented by one or more processors or microprocessors, or by circuit configurations for a given function. Also, for example, the functional blocks according to the present disclosure may be implemented in various programming or scripting languages. The functional blocks may be implemented as algorithms running on one or more processors. In addition, the present disclosure may use techniques of the related art for electronic configuration, signal processing, and/or data processing, and the like. The terms "module," "configuration," and the like are used extensively and are not limited to mechanical and physical configurations.

Also, the connecting lines or connection members between the components shown in the drawings are only examples of functional connections and/or physical or circuit connections. In practically available devices, connections between components can be represented by various functional connections, physical connections, or circuit connections, which are replaceable or added.

The present disclosure will be described in detail with reference to the accompanying drawings.

FIG. 1 is a view for explaining data output through a screen of a display 100.

The data output through the screen of the display 100 includes visible light communication (VLC) data.

Referring to FIG. 1, the VLC data may be output through the screen of the display 100.

Here, the display 100 may refer to any electronic apparatus capable of outputting a certain screen through visible light. In detail, the display 100 may blink several tens or more times per second and may change the brightness to a plurality of distinguishable levels. The display 100 may refer to an electronic apparatus that outputs a screen by using a light-emitting device that outputs visible light.

In one or more embodiments, the display 100 may be an electronic apparatus that quickly blinks and/or changes the brightness to a plurality of scales by using a light-emitting device such as a light-emitting diode (LED) or a laser diode (LD), and may be a TV, a digital signage, a digital sign, smartphone, a tablet personal computer (PC), a PC, a personal digital assistant (PDA), a laptop computer, a media player, an electronic book terminal, a digital broadcast terminal, a navigation device, or the like.

VLC data output through the display 100 may be received through a light receiving device that recognizes a screen output through a visible light, such as a photodiode (PD), an image sensor, or the like. Hereinafter, any device that recognizes a screen output through visible light will be referred to as a 'light receiver'.

The VLC may be a method using a photodiode (PD) or a method using optical camera communication (OCC), which are classified depending on how an image output through a visible light is recognized.

First, according to a method using a PD, VLC data output through an LED element is received through a PD device. In this case, a separate receiving device such as a PD device is used to receive the VLC data. In this case, since a LED device that blinks at high speed and a PD device that recognizes the high-speed blinking operation are used, VLC data may be transmitted and received at a high speed.

Secondly, a method using OCC, which is a practically widely available method, may be implemented by using a camera or an image sensor of a portable smart device such as a smartphone. Thus, smart devices may implement the OCC at a lower cost than Li-Fi communications that use a PD to perform transmission and reception of data.

According to the present disclosure, the VLC may include the method using a PD device and the method using OCC, and the PD device, cameras, or various types of image sensors may be referred to as 'light receiving devices' or 'light receivers'.

In addition, as an example of a display outputting a certain screen, a display including a light-emitting device array including light-emitting devices that quickly blink, such as LED devices that blink several times or more per second, will be described.

Referring to FIG. 1, a digital TV is illustrated as an example of the display 100.

Referring to FIG. 1, the display 100 may output a screen 110. Hereinafter, a case in which the display 100 includes a LED array and outputs the screen 110 through the LED array will be described.

In addition, the blink speed of the LED array may be expressed based as a frequency. For example, when the LED array blinks 100 times per second, the blink speed may be expressed as 100 Hz. When the LED array blinks 120 times per second, the blink speed may be expressed as 120 Hz. When the LED array blinks 240 times per second, the blink speed may be expressed as 240 Hz. That is, when the blink speed of the LED array is high, the frequency value of the VLC becomes great, and when the blink speed of the LED array is low, the frequency value of the VLC becomes small.

In the above example, in the case in which the VLC data value when blinking occurs once at 120 Hz is set to 0 and the VLC data value when blinking occurs once at 240 Hz is set to 1, when the LED array is blinked at 120 Hz or 240 Hz, binary data may be generated and output. For example, when the LED array blinks twice at 120 Hz, once at 240 Hz, and then once at 120 Hz, the binary data '0 0 1 0' may be generated and output.

Referring to FIG. 1, screen 120, screen 130, and screen 140 may show VLC data received from an electronic apparatus when the electronic apparatus receives the VLC data output through a screen 110. In an embodiment, the screen 120, screen 130, and screen 140 are screens recognized by an electronic apparatus including an image sensor driven by a rolling shutter method.

In an embodiment, the screen 120 is a screen recognized by an electronic apparatus when the display 100 outputs the screen 110 at a rate in which the display 100 blinks 100 times per second. In an embodiment, the screen 130 is a screen recognized by an electronic apparatus when the display 100 outputs the screen 110 at a rate in which the display 100 blinks 120 times per second. In an embodiment, the screen 140 is a screen recognized by an electronic apparatus when the display 100 outputs the screen 110 at a rate in which the display 100 blinks 240 times per second.

As in the screen 120, screen 130 and screen 140 illustrated in FIG. 1, VLC data having data values that vary according to the number of blinks (or blink rate) of the LED array included in the display 100 may be transmitted or received.

In an embodiment, VLC data having data values that vary according to the brightness level of the LED array included in the display 100 may be transmitted or received. For example, when an LED array represents 256 scales of brightness values, the VLC data may include 256 different data values corresponding to the 256 scales of brightness values.

An electronic apparatus according to an embodiment may be, as explained in connection with FIG. 1, any electronic apparatus that receives data by recognizing a screen of a display when data is output through the screen of the display. In detail, an electronic apparatus according to an embodiment may be any electronic apparatus that processes data received through a screen output by a display, wherein the data may be the above-described VLC data, data using OCC for example, data that is output in the form of, for example, QR code, data that is received by the recognition of a screen itself.

Embodiments of the present disclosure disclose a method and apparatus for processing data based on data received by a screen output by an external display, for example, VLC data, and will now be described with reference to FIGS. 2 to 13.

FIG. 2 is a block diagram illustrating an electronic apparatus 200 according to an embodiment.

Referring to FIG. 2, the electronic apparatus 200 according to the present embodiment includes a receiver 210 and a controller 220.

The electronic apparatus 200 may include any electronic apparatus that may receive data output through a screen displayed on an external display. For example, the electronic apparatus 200 may be an electronic apparatus capable of receiving VLC data from an image output by an external display 270. In an embodiment, the electronic apparatus 200 may be an electronic apparatus capable of receiving OCC data from an image output by the external display 270. In an embodiment, the electronic apparatus 200 may be a mobile computing device or non-mobile computing device, such as a wearable device, a smartphone, a tablet PC, PC, a personal digital assistant (PDA), a laptop computer, a media player, a micro server, a global positioning system (GPS) apparatus, an electronic book terminal, a digital broadcasting terminal, a TV, a navigation device, kiosk, a MP3 player, a digital camera, an electronic control device of a car, or a central information display (CID), but is not limited thereto.

In an embodiment, the receiver 210 of the electronic apparatus 200 may include at least one light receiving element that recognizes an output screen by using visible light, and the electronic apparatus 200 may be any electronic apparatus that processes VLC data received by the receiver 210.

The electronic apparatus 200 according to the present embodiment includes the receiver 210 which receives data output through the screen of the external display 270, and the controller 220 which includes a memory including one or more instructions, and at least one processor executing one or more instructions stored in the memory.

Herein, the controller 220, when the external display 270 outputs an image corresponding to content, obtains data that is output through the image, that is, first data including information associated with the content, obtains network connection information for connecting to a network associated with the content based on the first data, and controls at least one of the electronic apparatus 200 and an external electronic apparatus to be connected to the corresponding network by using network connection information.

In this regard, the receiver 210, when the external display 270 displays an image corresponding to content, may receive data through an image output by the external display 270.

Hereinafter, from among data received by the receiver 210, data that is output through an image corresponding to content displayed by the external display 270 and that includes information associated with the content will be referred to as 'first data.'

In this regard, 'first data' may be VLC data. In an embodiment, the receiver 210, when the external display 270 displays an image corresponding to content, may obtain VLC data including information associated with the content through the displayed image.

In an embodiment, the receiver 210 may include at least one light receiving element that recognizes an output screen by using visible light, and may recognize an output screen by using the light receiving element using visible light. In an embodiment, the receiver 210 includes a light receiving element, such as a PD or an image sensor, and may recognize at least one of the change in blink and the change in brightness in an image that is output through visible light.

In an embodiment, when the electronic apparatus 200 is a smartphone, the receiver 210 may be a camera capable of recognizing an image. In an embodiment, the electronic apparatus 200 may include a camera and a separate optical receiving device, for example, a sensor including a PD.

Hereinafter, for ease of convenience, an embodiment in which the receiver 210 includes at least one light receiving element to receive VLC data, will be described as an example. The present embodiment will be described by using VLC data as an example of the first data received by the receiver 210.

Referring to FIG. 2, the external display 270 outputs a screen that is visually recognized by a user by using visible light. The external display 270 may be an electronic apparatus that quickly blinks and/or changes the brightness to a plurality of scales by using a light-emitting device such as an LED or an LD, and may be a TV, a digital signage, a digital sign, a smartphone, a tablet personal computer (PC), a PC, a PDA, a laptop computer, a media player, an electronic book terminal, a digital broadcast terminal, a navigation device, or the like.

The receiver 210 recognizes the screen output by the external display 270 and may receive the first data. In an embodiment, the receiver 210 may recognize at least one of the blink rate and brightness change of the screen output by the external display 270 and may receive VLC data output by the external display 270. In this regard, an image displayed by the external display 270 is an image corresponding to content. In this regard, the content may be i) broadcast content transmitted by a broadcasting station, such as a drama, an amusement program, a movie, or news, ii) video content, such as movie content, gaming content, advertisement content, etc., provided by a given server or device, iii) a social network service supply application transmitted by a server or device providing a social network service, or the like. In addition, the content may include any content that displays a certain user interface screen or a certain screen.

The controller 220 includes a memory including one or more instructions, and at least one processor executing one or more instructions stored in the memory.

In an embodiment, the processor may be embodied as a system on chip (SoC) in which a core is integrated with a graphics processing unit (GPU). In an embodiment, the processor may include a single core, a dual core, a triple core, a quad core, and a core of the multiple of these. Also, the processor may include a plurality of processors. For example, the processor may be implemented as a main processor and a sub processor operating in a sleep mode.

The controller 220 may control the electronic apparatus 200 to perform operations by using the processor.

The controller 220 obtains network connection information based on the first data received by the receiver 210, for example, VLC data. Based on the obtained network connection information, at least one of the electronic apparatus 200 and an external electronic apparatus performs an operation for the connection to a network. In this regard, the network connection information includes information used to connect with a network associated with the content.

The external electronic apparatus used herein refers to an independent electronic apparatus that is physically distinct from the external display 270 and the electronic apparatus 200. In an embodiment, the external electronic apparatus may refer to an electronic apparatus capable of transmitting and receiving data to and from the electronic apparatus 200 through a wired/wireless communication network.

In an embodiment, the external display 270 may output a screen including VLC data by using the change in at least one of the blink rate and the brightness scale of a light-emitting device included therein.

In an embodiment, the network associated with the content may be, for example, i) a network for access to a server or apparatus which provides content, ii) a network for access to a server or apparatus which provides a service associated with content or information associated with content, iii) a network for access to a server or apparatus which provides an application providing content, or iv) a network for access to a server or apparatus which provides auxiliary information and auxiliary service which are associated with content. Accordingly, the network connection information may include information for connecting to a server or apparatus which provides at least one of the content, a service associated with the content, and information associated with the content.

For example, when the external display 270 displays a news broadcast of a particular station, content may be a news broadcast. A network associated with a news broadcast, which is content, may be, for example, i) a network for access to a server of a particular broadcast station providing a news broadcast or a broadcast transmission device of the particular broadcast station, ii) a network for access to a service associated with a news broadcast, for example, a broadcast bulletin board where you post opinions about a news broadcast or a news program app that shows the broadcast details of a news broadcast, iii) a network for access to a DMB application, which is an application providing a news broadcast, or a real-time broadcast playback application of a particular broadcast station, or iv) a network for access to a server or apparatus for providing auxiliary information, for example, traffic information at a specific location where an accident occurred, about news events from a news broadcast, for example, news about the occurrence of the accident.

In an embodiment, to allow the electronic apparatus 200 to be connected to a target network, the network connection information may include, as information used to access to the target network, a uniform resource locator (URL), and/or an internet protocol (IP).

In an embodiment, the first data, for example, VLC data, output by the external display 270 may include information associated with content. In an embodiment, the information associated with content may include information about the displayed content, connection information about a network associated with content, or the like.

Hereinafter, an embodiment in which the content is broadcast content transmitted by a broadcasting station will be described. In this case, information associated with content may be electronic program guide (EPG) information generated and transmitted by a broadcasting station, information including a URL of a broadcast station or server transmitting content, or the like.

Also, information associated with content in the first data, for example, VLC data, may be transmitted from a server transmitting content, for example, a broadcasting station server or an apparatus directly to the external display 270. In an embodiment, information associated with content in VLC data may be information that is generated by the external display 270 by using content. In an embodiment, information associated with content in first data, for example, VLC data, may be a screen that regenerates content.

For example, when information associated with content in the first data, for example, VLC data, includes a screen that regenerates content, the electronic apparatus 200 may obtain the screen included in VLC data as information about content by optical character reader (OCR) recognition or automatic content recognition (ACR) recognition.

The controller 220 may decode the received first data, for example, VLC data, and obtain information associated with content in the VLC data. By using the information associated with content, the network connection information may be obtained.

In an embodiment, the 'receiver 210' illustrated in FIG. 2 may be included in a data receiver. In this regard, the data receiver may include a plurality of modules that are to receive various types of data transmitted by an external electronic apparatus, an external display, or the like.

In an embodiment, the data receiver may receive VLC data through the receiver 210 included in the electronic apparatus 200. In an embodiment, the data receiver may include a wired/wireless communication module for transmitting/receiving wired/wireless data, a sound wave receiving module capable of receiving sound wave data, for example, a mic or a microphone. Accordingly, the data receiver may receive wired/wireless data or sound wave data. In an embodiment, wired/wireless data or sound wave data is data corresponding to VLC data, and may include information associated with content.

For example, the data receiver may receive wireless data, for example, Wi-Fi data that is formed according to a Wi-Fi communication standard. In an embodiment, the data receiver may receive Wi-Fi data including information associated with content transmitted by the external display 270. In this case, the controller 220 may, based on the received Wi-Fi data, obtain network connection information for connecting to a network associated with content, and performs an operation for at least one of the electronic apparatus 200 and an external electronic apparatus to connect to a network by using the obtained network connection information.

In an embodiment, a data receiver may receive sound wave data, for example, ultrasound data, or radio frequency (RF) data. In an embodiment, the data receiver may receive sound wave data including information associated with content transmitted by the external display 270. In this case, the controller 220 may, based on the received sound wave data, obtain network connection information for connecting to a network associated with content, and may perform an operation for at least one of the electronic apparatus 200 and an external electronic apparatus to connect to a network by using the obtained network connection information.

As described above, in the present embodiment, the data receiver, such as the receiver 210, may receive VLC data, wireless data, or sound wave data. The controller 220 may, based on information associated with content in the received data, may obtain network connection information for connecting to a network associated with content, and perform an operation for at least one of the electronic apparatus 200 and an external electronic apparatus to connect to a network by using the obtained network connection information.

Hereinafter, an embodiment in which data received by the electronic apparatus 200 according to an embodiment is VLC data will be described.

Figure 3:
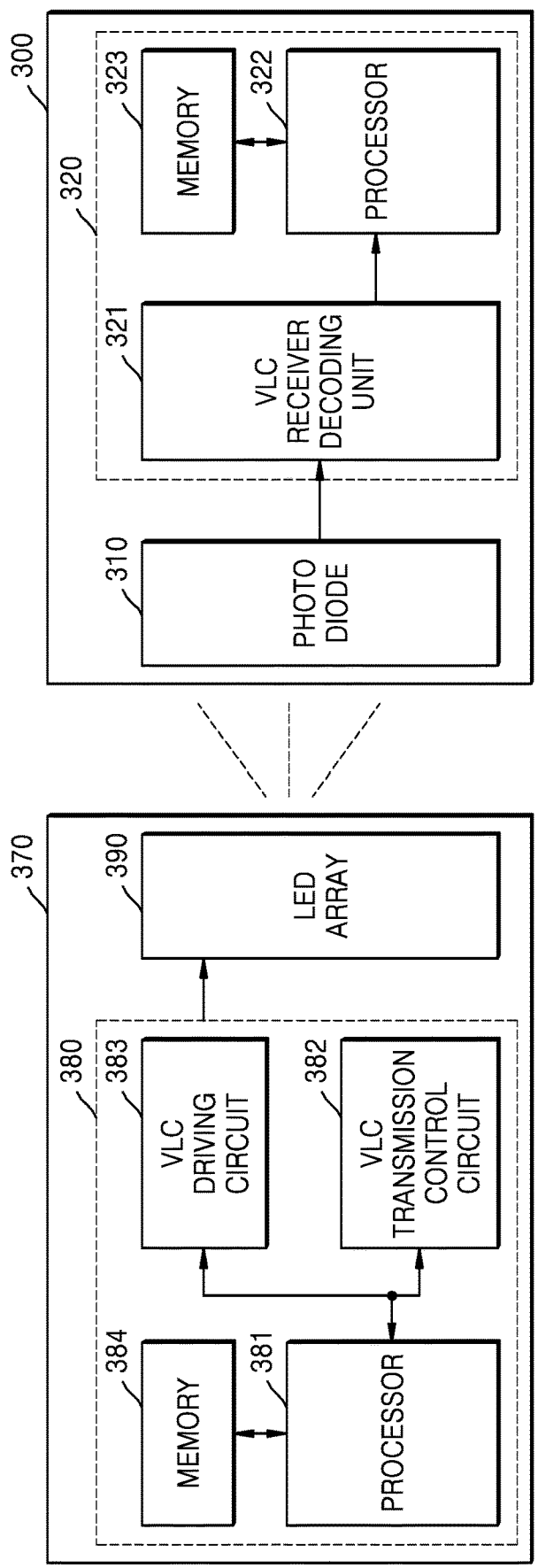
FIG. 3 is a block diagram illustrating an electronic apparatus and an external display, according to an embodiment.

FIG. 3 is a block diagram illustrating an electronic apparatus 300 and the external display 370, according to an embodiment;

Referring to FIG. 3, the electronic apparatus 300 includes a receiver 310 and a controller 320. The receiver 310 and the controller 320 illustrated in FIG. 3 correspond to the receiver 210 and the controller 220 illustrated in FIG. 2, respectively. In an embodiment, the external display 370 illustrated in FIG. 3 corresponds to the external display 270 illustrated in FIG. 2. Accordingly, the description that had been provided in connection with FIG. 2 will be omitted.

Referring to FIG. 3, a PD is illustrated as an example of the receiver 310.

Hereinafter, the operation of the electronic apparatus 300 for obtaining VLC data through the external display 370 will be described in detail with reference to FIG. 3.

Referring to FIG. 3, the external display 370 may include a controller 380 and a display 390.

First, an example of how the external display 370 transmits VLC data will now be described. The external display 370 may be any electronic apparatus that includes a display and outputs a certain screen that is visually recognizable by a user. The display 390 may include light-emitting devices that output visible light. In connection with FIG. 3, an LED array will be described as an example of the display 390. Accordingly, hereinafter, the display 390 will also be referred to as the LED array 390.

The controller 380 of the external display 370 may control an image corresponding to content to be displayed on the LED array 390.

Also, the controller 380 of the external display 370 may control VLC data including information associated with displayed content to be output through a screen displayed in a display, for example, the LED array 390.

In an embodiment, the controller 380 may control information associated with content to be modulated in various manners, and based on the modulated information, may drive the LED array 390 in such a way that the blink and brightness of the LED array 390 is controlled. Accordingly, the LED array 390 may output VLC data including information associated with content.

In an embodiment, the controller 380 may include a processor 381, a VLC transmission control circuit 382, a VLC driving circuit 383, and a memory 384. The processor 381 may obtain and/or generate information associated with content.

The memory 384 may store a program for the processor 381 to perform a certain operation, at least one command, and setting data. In an embodiment, the memory 384 may set and store a modulation manner used by the processor 381 to output VLC data.

The VLC transmission control circuit 382 may modulate VLC data including information associated with contents according to a certain modulation manner. In this regard, the modulation manner of VLC data may be, for example, on-off keying (OOK), pulse position modulation (PPM), pulse width modulation (PWM), non return to zero (NRZ), or frequency-shift keying (FSK). For example, when PWM is used as the modulation manner of the VLC data, the brightness of the display 390 is adjusted by using the widths by the bright or dark regions regardless of the kind of the light-emitting device, to generate VLC data that is modulated in a PWM manner.

The VLC driving circuit 383 may drive a display, for example, the LED array 390 according to the modulation manner of the VLC transmission control circuit 382. According to the control of the VLC driving circuit 383, the display, for example, the LED array 390 may control the blink and brightness of light-emitting devices, for example, LED devices included therein to output a screen corresponding to content.

In the case of an LED array using LED devices, due to the rapid change in brightness and the rapid blink operation of an LED, when VLC data is output according to certain modulation technology, data may be transmitted up to a rate of 10 Gbps. In an embodiment, when a light-emitting device blinks 40 to 50 times per second, human eyes may not recognize the blink of the light-emitting device and may determine that the light-emitting device is continuously turned on. Accordingly, the user of the external display 370 may view the screen output by the display, for example, the LED array 390, without the eyes being bothered by, for example, flickering.

That is, the external display 370 may transmit VLC data at a high transmission rate without inconveniencing the user.

The electronic apparatus 300 according to an embodiment may receive VLC data output from the external display 370 and may obtain and utilize network connection information.

The receiver 310 of the electronic apparatus 300 may include a light-receiving apparatus or an image sensor including at least one of any optical receiver capable of recognizing a screen output through visible light, for example, a light receiving element, such as a LED device. In FIG. 3, a PD is illustrated as an example of the receiver 310. Hereinafter, the receiver 310 may also be referred to as the PD 310.

The PD 310 may recognize an image corresponding to content output by the LED array 390 of the external display 370. In an embodiment, the PD 310 may receive visible light corresponding to an image output from the LED array 390. For example, the PD 310 may directly sense the number of blinks and the brightness change of the visible light corresponding to the image output from the LED array 390.

In an embodiment, when the receiver 310 includes an image sensor driven in a rolling shutter manner, the image sensor may receive VLC data by using a change in a pattern which appears as a band in the sensed image, for example, a change in a pattern such as a band appearing in the screen 120, screen 130, and screen 140 illustrated in FIG. 1.

This pattern means a change in the band that the human eye may not recognize. Therefore, the pattern change in the screen 120, screen 130, and screen 140 is not recognized by the human eye, but is sensed by the image sensor, and accordingly, data communication may be performed without interfering with what the viewer is viewing.

The controller 320 may include a VLC receiver decoding unit 321, a processor 322, and a memory 323.

The VLC receiver decoding unit 321 may receive VLC data that had been modulated in a certain manner from the PD 310 and may decode the modulated VLC data. The processor 322 may obtain information associated with contents from the VLC data that had been decoded in the VLC receiver decoding unit 321. The processor 322 may obtain network connection information for connecting to a network associated with content in the VLC data, and may perform such an operation that at least one of the electronic apparatus 300 and an external electronic apparatus is connected to a network by using network connection information. The connection operation of at least one of the electronic apparatus 300, controlled by the controller 320, and an external electronic apparatus to a network will be described in connection with FIGS. 5 to 13.

Figure 4:
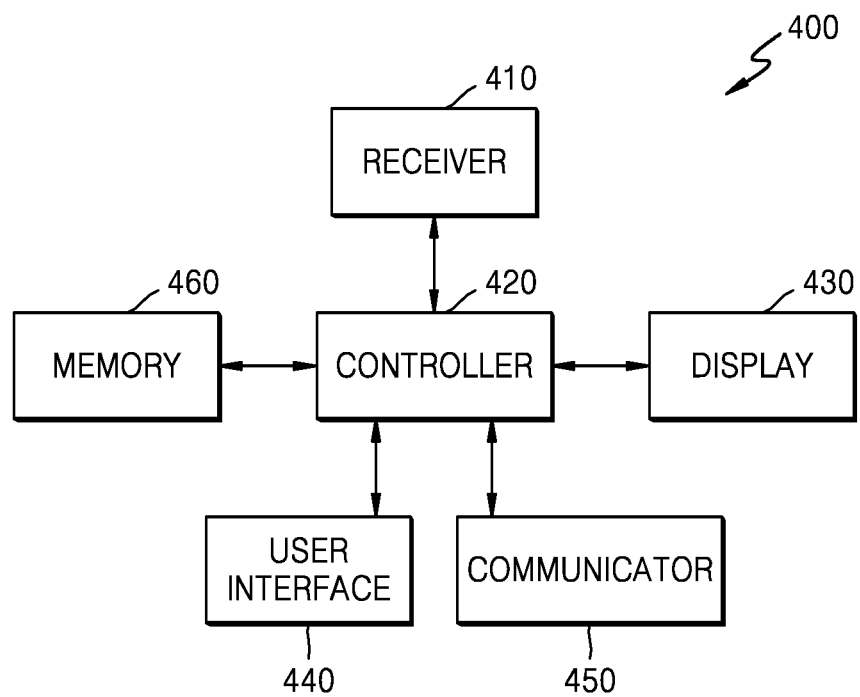
FIG. 4 is a detailed block diagram illustrating an electronic apparatus according to an embodiment.

FIG. 4 is a detailed block diagram illustrating an electronic apparatus 400 according to an embodiment.

FIG. 4 is a block diagram illustrating the details of an electronic apparatus according to an embodiment, for example, the electronic apparatus 200 or the electronic apparatus 300) shown in FIG. 2 or 3. The electronic apparatus 400 including a receiver 410 and a controller 420 illustrated in FIG. 4 corresponds to the electronic apparatus 200 including the receiver 210 and the controller 220 illustrated in FIG. 2. The electronic apparatus 400 including the receiver 410 and the controller 420 illustrated in FIG. 4 corresponds to the electronic apparatus 300 including the receiver 310 and the controller 320 illustrated in FIG. 3. Therefore, in explaining the electronic apparatus 400 shown in FIG. 4, the descriptions that had been provided in connection with the electronic apparatus 200 and the electronic apparatus 300 will be omitted.

Unlike the electronic apparatus 200 or the electronic apparatus 300, the electronic apparatus 400 may further include at least one of a display 430, a user interface 440, a communicator 450, and a memory 460. In this regard, each of the display 430, the user interface 440, the communicator 450, and the memory 460 may perform a certain operation according to a control of the controller 420, for example, a processor included in the controller 420. That is, the controller 420 may control at least one of the display 430, the user interface 440, the communicator 450, and the memory 460 to allow the electronic apparatus 400 to perform a certain operation.

The display 430 may display a screen corresponding to image data.

In an embodiment, the display 430 may display a screen corresponding to content. The display 430 may include a display panel that includes light-emitting devices that output light. In this regard, a display panel may be formed as the LED array 390 or the like.

The user interface 440 may receive user input for controlling the electronic apparatus 300. The user interface 440 may include a user input device including a touch panel for sensing a user's touch, a button for receiving a push operation of a user, a wheel for receiving a user's rotation operation, a keyboard, a dome switch, or the like. However, in one or more embodiments, the user interface 440 may include other devices.

In an embodiment, the user interface 440 may include a voice recognition apparatus for voice recognition. For example, the voice recognition apparatus may be a microphone, and the voice recognition apparatus may receive a voice command or voice request of the user. Accordingly, the controller 420 may control an operation corresponding to the voice command or voice request to be performed.

In an embodiment, the user interface 440 may include a motion detection sensor. For example, a motion detection sensor may sense the motion of the electronic apparatus 400 and receive the detected motion as a user input. For example, when the electronic apparatus 400 vertically moves with respect to an external display and remains for a preset time period, for example, 2 seconds or more, the motion detection sensor may drive the receiver 410 of the electronic apparatus 400 and receive VLC data through the receiver 410.

In an embodiment, the voice recognition apparatus and the motion detection sensor described above may be not included in the user interface 440, but be included as a module independent of the user interface 440 in the electronic apparatus 400.

In an embodiment, the user interface 440 may receive a user input of requesting that the network connection information obtained by the controller 420 be transmitted to an external electronic apparatus. Once the user input of requesting that the network connection information obtained by the controller 420 be transmitted to the external electronic apparatus is received, the controller 420, in response to the received user input, may control the network connection information to be transmitted to the external electronic device through the communicator 450.

The communicator 450 may communicate with an external electronic apparatus or a server through wired communication or wireless communication. In an embodiment, the communicator 450 may include at least one communication module of a short-range communication module, a wired communication module, a mobile communication module, a broadcast reception module, and the like. In this regard, the at least one communication module is a communication module capable of performing transmission and reception of data through network that conforms to communication standards such as Bluetooth, wireless local area network (WLAN) (Wi-Fi), wireless broadband (WiBro), world interoperability for microwave access (WiMAX), code-division multiple access (CDMA), wideband code-division multiple access (WCDMA), or the like.

In an embodiment, the communicator 450 may transmit network connection information to at least one external electronic apparatus under the control of the controller 420.

The memory 460 may include at least one of the programs including certain data, and instructions for performing certain operations. In an embodiment, the memory 460 may include a processor for executing certain program.

In an embodiment, the memory 460 may include at least one type of storage medium selected from a flash memory type storage medium, a hard disk type storage medium, a multimedia card micro type storage medium, a card type memory, for example, SD or xD memory or the like, a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

In an embodiment, the memory 460 may store at least one program containing instructions for performing the above-described operations. In an embodiment, the memory 460 may store at least one processor for performing a program including instructions for performing the above-described operations. In an embodiment, the memory 460 may be included in the controller 420 or may not be included in the controller 420. In an embodiment, the memory 460 may be formed separate from a memory included in the controller 420.

In an embodiment, the memory 460 may store network connection information obtained by the controller 420, and may store information corresponding to certain obtained content based on the network connection information.

Hereinafter, operations performed in an electronic apparatus according to an embodiment will be described in detail with reference to FIGS. 5 to 13, by using the electronic apparatus 400 shown in FIG. 4 as an example of the electronic apparatus.

Figure 5:
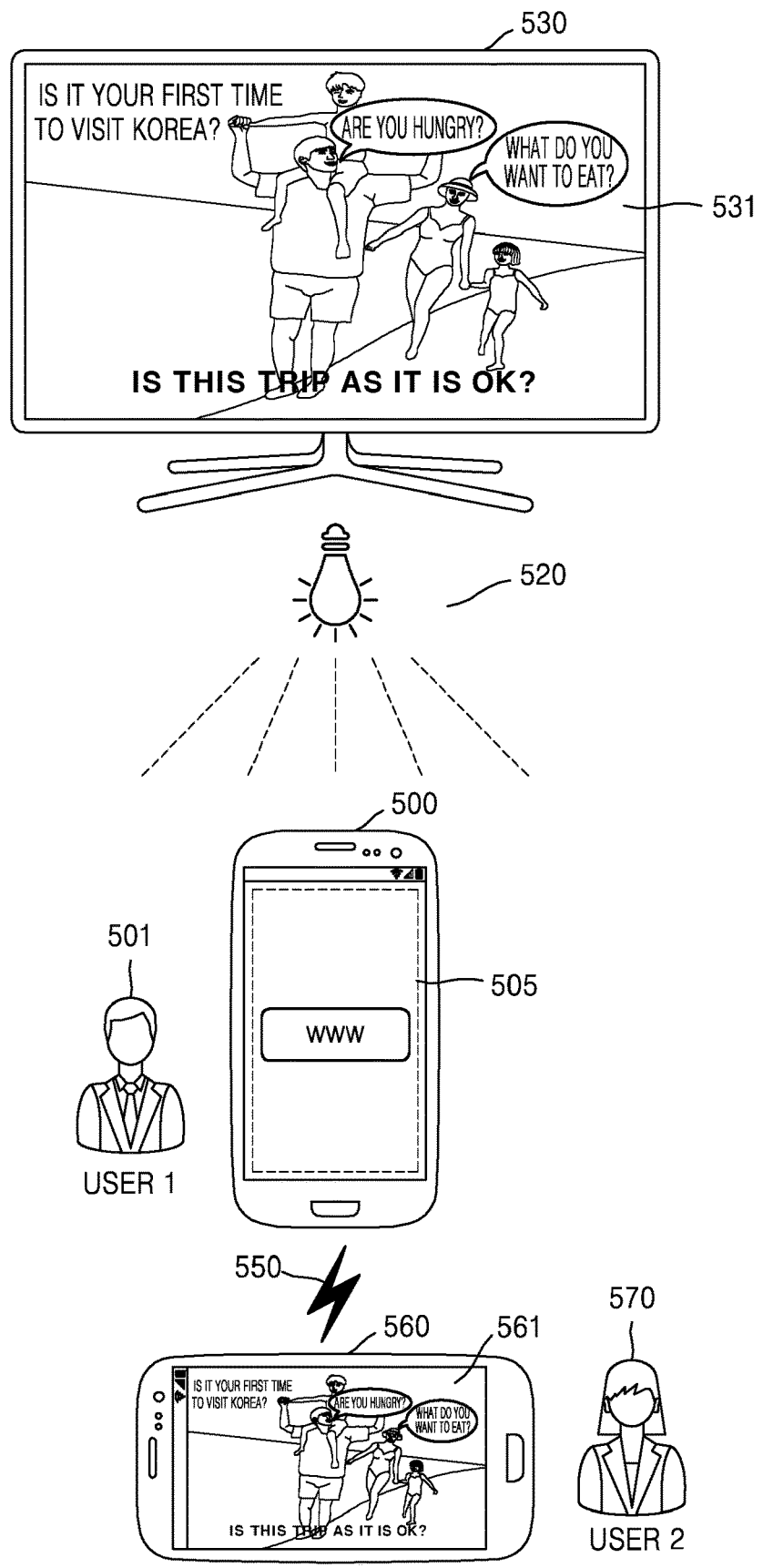
FIG. 5 is a diagram illustrating an operation to obtain and use first data, for example, visible light communication (VLC) data,) in an electronic apparatus according to an embodiment.

FIG. 5 is a diagram illustrating an operation to obtain and use VLC data in an electronic apparatus 500 according to an embodiment. In FIG. 5, an external display 530 and the electronic apparatus 500 may respectively correspond to the external display 370 and the electronic apparatus 200, electronic apparatus 300, or electronic apparatus 400 described above. Therefore, in explaining the external display 530 and the electronic apparatus 500 illustrated in FIG. 5, descriptions that had been provided in connection with FIGS. 2 to 4 will be omitted.

Figure 6:
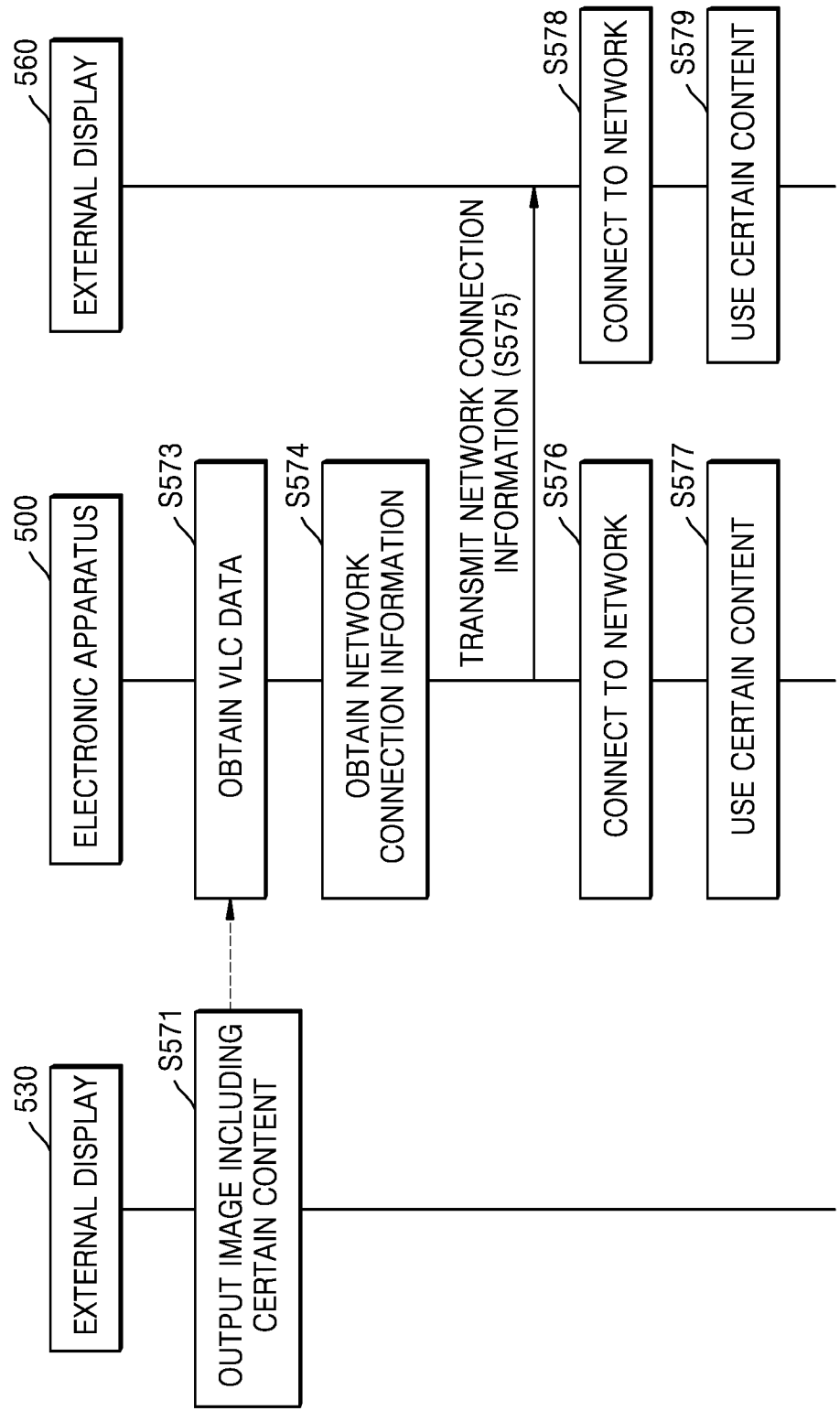
FIG. 6 is a diagram for explaining operations performed to share and use content based on VLC data in an electronic apparatus according to an embodiment.

FIG. 6 is a diagram for explaining operations performed to share and use content based on VLC data in an electronic apparatus according to an embodiment. Referring to FIGS. 5 and 6, like elements are denoted by like reference numerals.

In detail, FIG. 5 is a block diagram illustrating the external display 530, the electronic apparatus 500, and an external electronic apparatus 560, and FIG. 6 is a flow diagram illustrating operations performed among the external display 530, the electronic apparatus 500, and the external electronic apparatus 560.

Referring to FIGS. 5 and 6, the external display 530 displays an image 531 corresponding to content at operation S571. In FIG. 5, an entertainment program produced and transmitted by a certain broadcasting station is used as an example of the content displayed by the external display 530. In an embodiment, the electronic apparatus 500 used by a first user 501 may be a smartphone. Hereinafter, the electronic apparatus 500 will also be referred to as the smartphone 500. In an embodiment, hereinafter, the electronic apparatus 500 illustrated in FIGS. 5 and 6 will be described in connection with the elements of the electronic apparatus illustrated in FIG. 4, for example, the receiver 410, the controller 420, the display 430, the user interface 440, and/or the communicator 450, and the memory 460.

Referring to FIG. 5, the electronic apparatus 500 receives VLC data included in the image 531 through a VLC 520 at operation S573.

In this regard, the receiving of VLC data may be performed in correspondence to the user input received by the electronic apparatus 500. For example, during the user of the electronic apparatus 500 views an image output by the external display 530, when the user wants to know network connection information associated with content corresponding to the viewed image, the user may allow the receiver, for example receiver 410 of FIG. 4, of the image 531 of the electronic apparatus 500 and manipulate a certain key included in the user interface, for example user interface 440 of FIG. 4. Once the electronic apparatus 500 receives the user input corresponding to the manipulation of the certain key, the electronic apparatus 500 may receive first data, for example, VLC data, output by the external display 530 through the receiver 410 in response to the user input.

In an embodiment, even when a key included in the user interface 440 is not directly manipulated, when detecting the user's voice request or a specific motion of the user, the electronic apparatus 500 may receive first data, for example, VLC data, in response to the user's voice request or a specific motion of the user.

For example, when a user vertically raises the electronic apparatus 500 in such a way that the receiver 410 faces the front side of the external display 530, the electronic apparatus 500 may recognize the users' motion as the request for receiving of VLC data and receive VLC data. In an embodiment, when the user inputs a pre-registered voice command, such as 'share the content that is currently viewed', 'content share', or 'visible light' through a voice recognition apparatus, such as a microphone of the electronic apparatus 500, VLC data may be received in response to the users' input voice.

In an embodiment, in response to various other methods, the electronic apparatus 500 may receive VLC data.

VLC data containing information associated with content is output through the image 531, and the receiver 410 of the electronic apparatus 500 may receive the output VLC data.

For example, VLC data may include information associated with entertainment program, which is content. Such information associated with an entertainment program may include connection information for connecting to entertainment programs, broadcasting information about entertainment programs, characteristics information about entertainment programs, information associated with entertainment programs, and information for connecting to a network associated with entertainment programs.

For example, information associated with content may include network connection or link information for access to a server or broadcasting station which transmits entertainment programs, EPG information corresponding to entertainment programs, a viewer's bulletin board associated with entertainment programs, real-time chat rooms of entertainment programs, information about actors of entertainment programs, and a screen corresponding to entertainment programs.

The controller 420 included in the electronic apparatus 500 may encode the received first data, for example, VLC data, and obtain information associated with content in first data, for example, VLC data, and based on the obtained information associated with content, may obtain network connection information associated with content at operation S574.

In this regard, when first data, for example, VLC data, includes EPG information corresponding to entertainment programs, the controller 420 included in the electronic apparatus 500 may obtain network connection information for connecting to a broadcasting station or server that transmits entertainment programs displayed based on EPG information. In an embodiment, the controller 420 may obtain network connection information for connecting to the viewer's bulletin board or real-time chat rooms of entertainment programs displayed based on EPG information. For example, the controller 420 may obtain network connection information in the form of a URL.

Then, the controller 420 may perform an operation for connecting at least one of the electronic apparatus 500 and the external electronic apparatus 560 to a network by using the network connection information.

In this regard, subsequent operations using network connection information may be performed in response to a user input.

In an embodiment, the user may enter a user input requesting operation S576 or operation S578 to be performed by using the user interface 440, before or after the network connection information is obtained. In this regard, the electronic apparatus 500 may then perform operation S576 or operation S578 in response to the user input. In an embodiment, even when a key included in the user interface 440 is not directly manipulated, when detecting the user's voice request or a specific motion of the user, the electronic apparatus 500 may perform operation S576 or operation S578 in response to the user's voice request or a specific motion of the user.

In an embodiment, to perform the operation of connecting to the network at operation S576 by using the network connection information, the electronic apparatus 500 may, before the obtaining of first data, for example, first data at operation S573, receive a user input of requesting the connection to a network. Once obtaining network connection information, the electronic apparatus 500 may immediately connect to a network.

In an embodiment, the external display 530 may output not only information for obtaining network connection information through the screen, but also a network connection command. By doing so, the electronic apparatus 500 may receive the network connection command together with the first data received through the screen of the external display 530, and accordingly, the electronic apparatus 500 may obtain and connect network connection information.

In an embodiment, for the electronic apparatus 500 to regenerate content, the controller 420 may be connected, based on the obtained network connection information, to a server or apparatus providing content, for example, a server of a broadcasting station transmitting entertainment programs at operation S576, and use content at operation S577.

For example, the electronic apparatus 500 may control content to be output by the display 430. In an embodiment, the electronic apparatus 500 may use, by using network connection information, content or a screen corresponding to the content as virtual reality (VR) content or augmented reality (AR) content. In an embodiment, the electronic apparatus 500 may create, by using network connection information, a group chat room or a separate bulletin board to share content with multiple users.

In an embodiment, the controller 420 may control, by using network connection information, information about a program currently viewed by the viewer to be provided to a broadcasting station so that the broadcasting station computes the audience ratings. In an embodiment, the controller 420 may, by using network connection information, connect to a particular ratings sever, and provide information about a program, the electronic apparatus 400 is currently watching, to the connected particular ratings sever. In an embodiment, the controller 420 may, by using network connection information, participate in a pool of broadcasts providing content. In an embodiment, the controller 420 may, by using network connection information, check whether you win the prize (or lottery ticket) provided by the given content.

In an embodiment, the controller 420 may, by using network connection information, obtain information about the weather and news corresponding to the time when content is output and the place where the electronic apparatus 400 is located. In an embodiment, the controller 420 may provide a notification function of notifying the user of the information about the weather and news obtained by using network connection information.

As described above, the electronic apparatus 500 may directly recognize an image output by the external display 530 to receive first data, for example, VLC data. Accordingly, without the operation for searching for the content displayed on the external display 530, the target content may be output by the electronic apparatus 500 conveniently and fast.

In an embodiment, when the first user 501 wants to watch, on the smartphone 500, an entertainment program that had been displayed on the external display 530, the first user 501 needs to manipulate the smartphone 500 to search which broadcasting station or which channel transmits the entertainment program displayed on the external display 530, and connect to the found broadcasting station or the server of the channel to regenerate the corresponding entertainment program.

In an embodiment, when the first user 501 wants to share media content being currently broadcast with a second user 570, the first user 501 needs to search for network connection information, for example, a URL for connecting to corresponding content, and to notify the second user 570. However, while watching TV, it is not easy to find the URL of the content. Even when the URL is found by, for example, information search, it is very troublesome to send the URL via, for example, an electronic message. When these processes take long, even when the first user 501 transmits the connection information including the URL to the second user 570, when the second user 570 receives and connects to the corresponding URL, the target content may no longer be provided and may be not available.

In an embodiment, when the electronic apparatus 500 is a head-mounted display (HMD) device such as a virtual reality (VR) device, since the electronic apparatus 500 may use a touchpad as a default input apparatus that receives a user input, the user input is not easy, and to connect to target content, complicated processes, for example menu selection, text input, etc., need to be performed, and accordingly, the connection time is long.

Accordingly, when a method of related art is used, complicated operations and long operation time are required to share content output by the external display 530.

Unlike methods of related art, in the case of an electronic apparatus according to an embodiment recognizes, the electronic apparatus 500 visually recognizes the image 531 output by the external display 530 to obtain network connection information about the corresponding entertainment program immediately. In an embodiment, the electronic apparatus 500 may perform the obtaining of the network connection information by receiving a user input that requests "VLC execution." In an embodiment, the electronic apparatus 500 may regenerate content directly on the smartphone 500 by receiving a user input that requests network connection based on VLC.

In an embodiment, the electronic apparatus 500 may transmit network connection information to at least one external electronic apparatus, for example, the external electronic apparatus 560 through a wired/wireless communication network 550 at operation S575. In this regard, the external electronic apparatus 560 refers to an independent electronic apparatus that is physically distinct from each of the external display 530 and the electronic apparatus 500. In an embodiment, the external electronic apparatus 560 may refer to an electronic apparatus capable of transmitting and receiving data to and from the electronic apparatus 500 through a wired/wireless communication network.

The user of the electronic apparatus 500 may input a user input of transmitting network connection information obtained through the user interface 440 to the external electronic apparatus 560. Then, the controller 420 may transmit the obtained network connection information to the external electronic apparatus 560 in response to the user input.

For example, when the first user 501 watches an entertainment program and wants to share the entertainment program with the second user 570 because the entertainment program is fun, the first user 501 may input a user input of requesting the transmission of network connection information to the external electronic apparatus 560, which is a smartphone of the second user 570, through the user interface 440. Then, in response to the user input, the controller 420 may transmit the network connection information to the external electronic apparatus 560 through a message corresponding to the external electronic apparatus 560, a message or mail of a social network service (SNS) registered by the second user 570 of the external electronic apparatus 560, or a mail or a chat program the second user 570 of the external electronic apparatus 560 has registered.

Accordingly, the first user 501 may quickly share content, for example, an entertainment program with the second user 570, without the need for complicated manipulation and a long time for the complicated manipulation.

Referring to FIGS. 5 and 6, the electronic apparatus 500 shares network connection information with a single external electronic apparatus, that is, the external electronic apparatus 560. However, the electronic apparatus 500 may transmit network connection information to a plurality of external electronic apparatuses simultaneously or sequentially, thereby allowing a plurality of users to share the corresponding content.

Accordingly, the external electronic apparatus 560 may quickly and conveniently use content at operation S579. In an embodiment, the external electronic apparatus 560 may quickly and conveniently receive an entertainment program by receiving the network connection information about the entertainment program. Referring to FIG. 5, the second user 570 may regenerate an entertainment program regenerated on the external display 530 through a smartphone, which is an example of the external electronic apparatus 560. Hereinafter, the external electronic apparatus 560 will also be referred to as the smartphone 560. Accordingly, the screen 561 of the smartphone 560 may output the same image 531 as on the external display 530.

For example, when network connection information includes an URL corresponding to a transmission server of an entertainment program, and the electronic apparatus 500 transmits, via a text message, the network connection information to the external electronic apparatus 560, the second user 570 may immediately regenerate the entertainment program by selecting the network connection information included in the text message, for example, URL.

Hereinafter, referring to FIGS. 7 to 13, embodiments in which at least one of the electronic apparatus 500 and the external electronic apparatus 560 share and use content or information or services associated with content based on the obtained network connection information will be described. Referring to FIGS. 7 to 13, like elements are denoted by like reference numerals.

Figure 7:
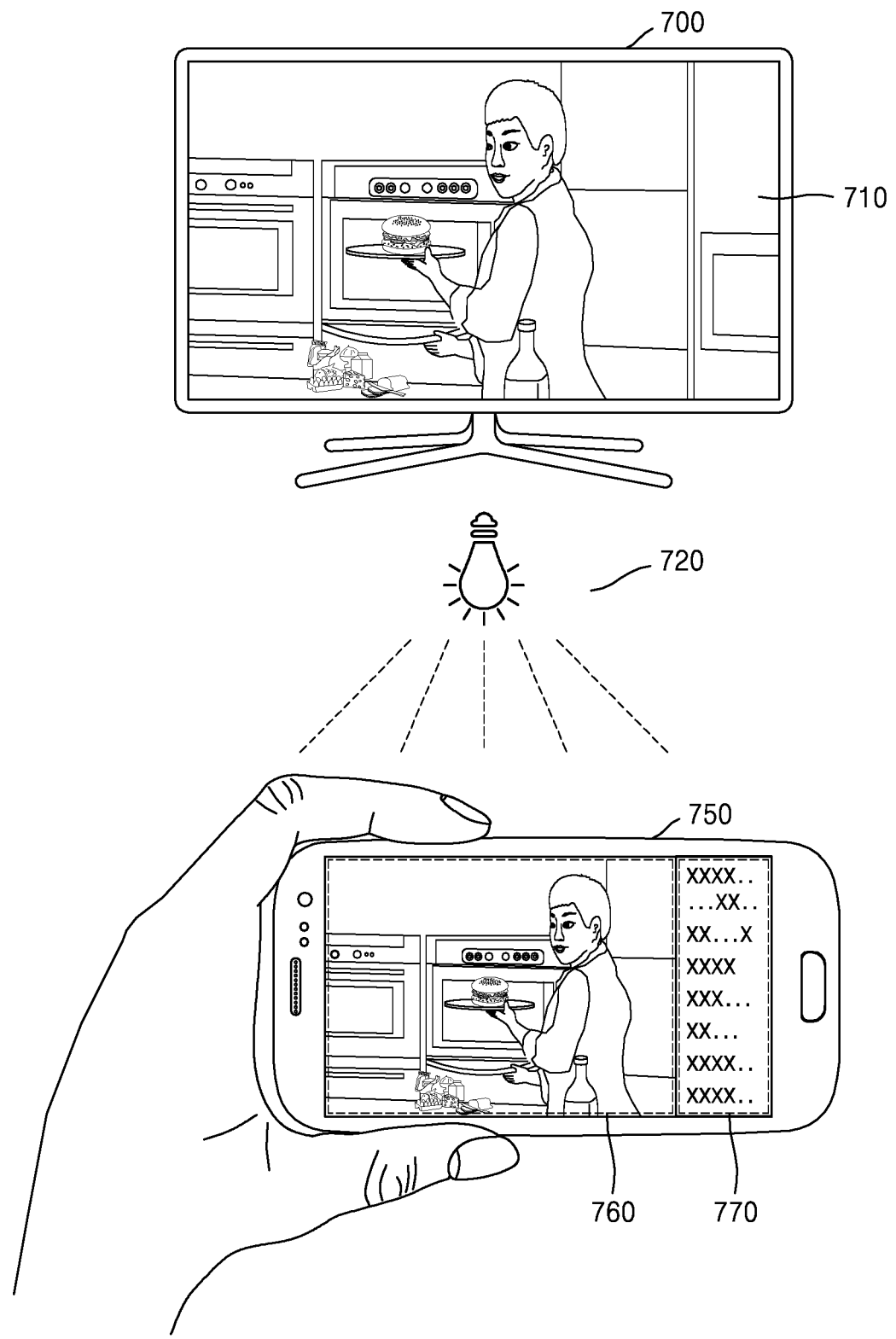
FIG. 7 is a diagram for explaining an operation of obtaining and using network connection information based on VLC data, performed by an electronic apparatus according to an embodiment.

FIG. 7 is a diagram for explaining an operation of obtaining and using network connection information based on the first data, performed by an electronic apparatus according to an embodiment. The external display 700 and an electronic apparatus 750 illustrated in FIG. 7 respectively correspond to the external display 370 or external display 530 and the electronic apparatus 300 or electronic apparatus 500 illustrated in FIGS. 3 and 5. Accordingly, the descriptions that had been provided in connection with FIGS. 3 to 6 will be omitted.

The present embodiment will be described by using VLC data as an example of the first data received by the electronic apparatus 750.

Referring to FIG. 7, the external display 700 displays an image 710 corresponding to content.

The electronic apparatus 750 receives VLC data transmitted through the VLC 720, and obtains network connection information for connecting to a network associated with content based on the received VLC data.

In an embodiment, electronic apparatus 750 may obtain the network connection information for connecting to a server or apparatus that provides at least one of content, a service associated with content, and information associated with content based on received VLC data.

For example, when content is a broadcast program, the service associated with content may be an official bulletin board or an official chat room of the broadcast program, and the information associated with content may be information about the broadcast program or information about the characters in the broadcast program.

In the embodiment illustrated in FIG. 7, when the content displayed by the external display 700 is a broadcasting program, the electronic apparatus 750 may obtain, as network connection information, information for connecting to a server or apparatus providing the broadcasting program, and information for connecting to a server corresponding to an official bulletin board or official chat room of the broadcasting program.

And, the electronic apparatus 750 may connect to a server or apparatus that provides at least one of content, a service associated with content, and information associated with content, based on received VLC data. Subsequently, the electronic apparatus 750 may use at least one of the content, services and information provided by the connected server or apparatus.

In the embodiment illustrated in FIG. 7, the electronic apparatus 750 may be connected to a server or apparatus, for example, a broadcasting station server that provides a broadcasting program which is content, receives the broadcasting program, and displays the broadcasting program on a screen 760 of the electronic apparatus 750. The electronic apparatus 750 may be connected to a server or an apparatus corresponding to an official bulletin board of a corresponding broadcasting program which is a service associated with a broadcasting program, which is content, and allows the official bulletin board to be displayed in a portion 770 of the screen 760.

In an embodiment, as illustrated in FIG. 7, when the external display 700 regenerates the cooking program, the electronic apparatus 750 may, based on obtained network connection information, be connected to a server or apparatus providing recipe information about cooking described in the cooking program, and may display the recipe information about the cooking obtained from the apparatus on the portion 770 of the screen 760.

As described in FIG. 7, a user of the electronic apparatus 750 according to an embodiment may quickly and conveniently use the content currently viewed on the external display 700. In an embodiment, when a user of electronic apparatus 750 moves out of the space where the external display 700 is located and moves to another place, the user of the electronic apparatus 750 may conveniently or quickly use the corresponding content or information or service associated with the corresponding content by using the electronic apparatus 750, without complicated manipulation for the search and use of the content watched through the external display 700.

In an embodiment, the user of the electronic apparatus 750 may input a user input of requesting the share of at least one of content, a service associated with the content, and information associated with content with an external electronic apparatus, for example, the external electronic apparatus 560 of FIG. 6, through the user interface 440. Once the user input is input, the controller 420 may control network connection information to be transmitted to an external electronic apparatus in response to the received user input.

For example, in the embodiment of FIG. 7, to share the obtained network connection information with friends, the user of the electronic apparatus 750, may request, via the user interface 440 of the electronic apparatus 750, network connection information to be transmitted to an external electronic apparatus, for example, the external electronic apparatus 560 of FIG. 6, which is connected to the electronic apparatus 750 through a wired/wireless communication network. Once the user input is received, in response to the user input, the electronic apparatus 750 may transmit network connection information to an external electronic apparatus, for example, the external electronic apparatus 560 of FIG. 6.

Figure 8:
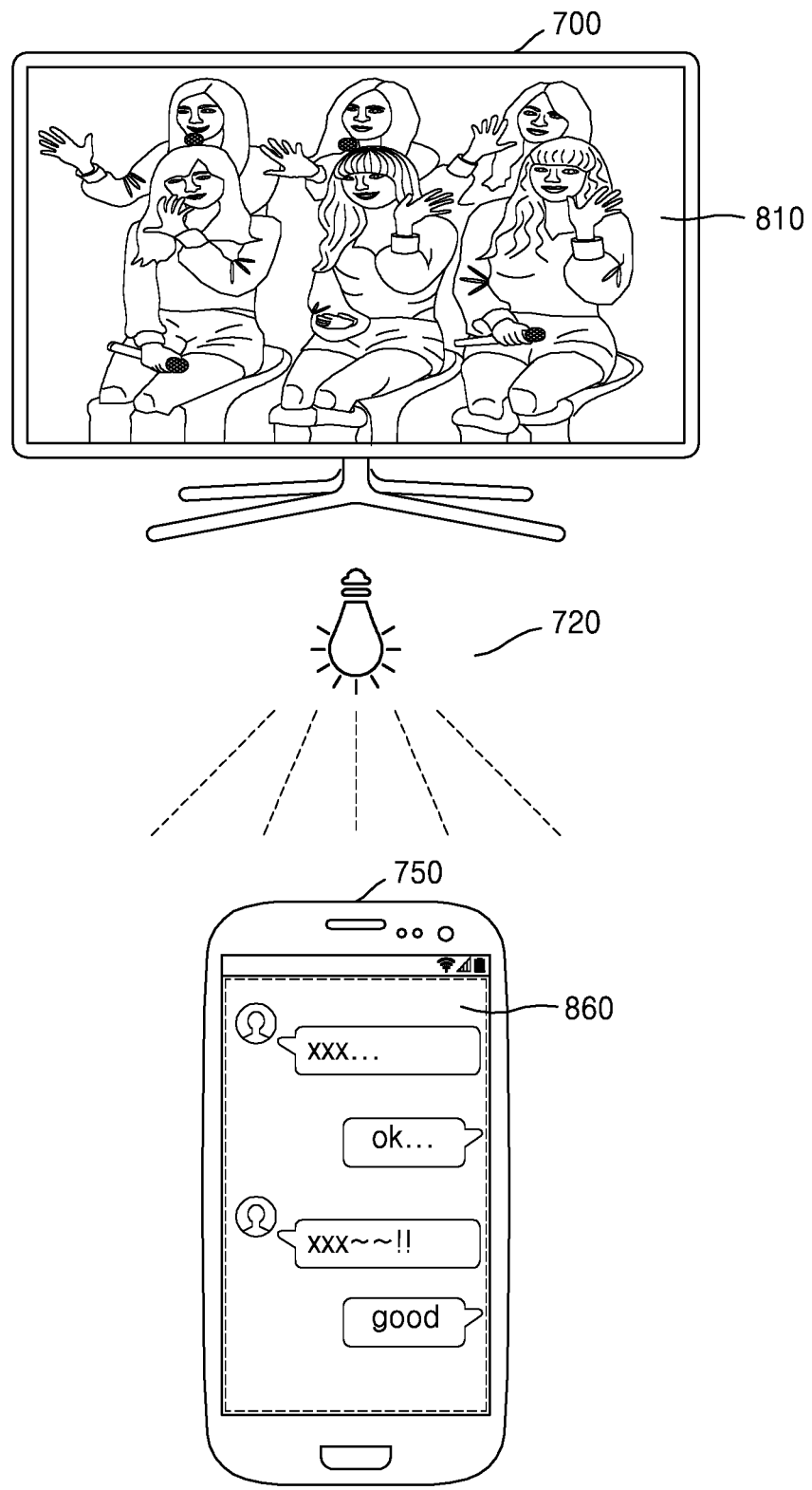
FIG. 8 is another diagram for explaining an operation of obtaining and using network connection information based on VLC data, performed by an electronic apparatus according to an embodiment.

FIG. 8 is another diagram for explaining an operation of obtaining and using network connection information based on VLC data, performed by an electronic apparatus according to an embodiment.

Referring to FIG. 8, an external display 700 displays an image 810 corresponding to content.

The electronic apparatus 750 receives VLC data transmitted through the VLC 720, and obtains network connection information for connecting to a network associated with content based on the received VLC data.

For example, the network associated with content may be a network connected to a messaging application in a social network service to share content, a network connected to a chat application to share content, a network that connects to a newly open chat room or a bulletin board of a social network service to share content, or the like.

Referring to FIG. 8, the electronic apparatus 750 newly opens a chat room 860 used by a user of the electronic apparatus 750, and may add obtained network connection information on the chat room 860.

In an embodiment, the electronic apparatus 750 may, based on network connection information, be connected to a server providing a dialog room, bulletin board, chat room, or live chat room associated with content, and display the dialog room, bulletin board, chat room, or live chat room associated with content and provided by the connected server on a display 430 of the electronic apparatus 750.

Accordingly, the user of the electronic apparatus 750 may quickly, conveniently enter the dialog room, bulletin board, chat room, or live chat room associated with content.

Figure 9:
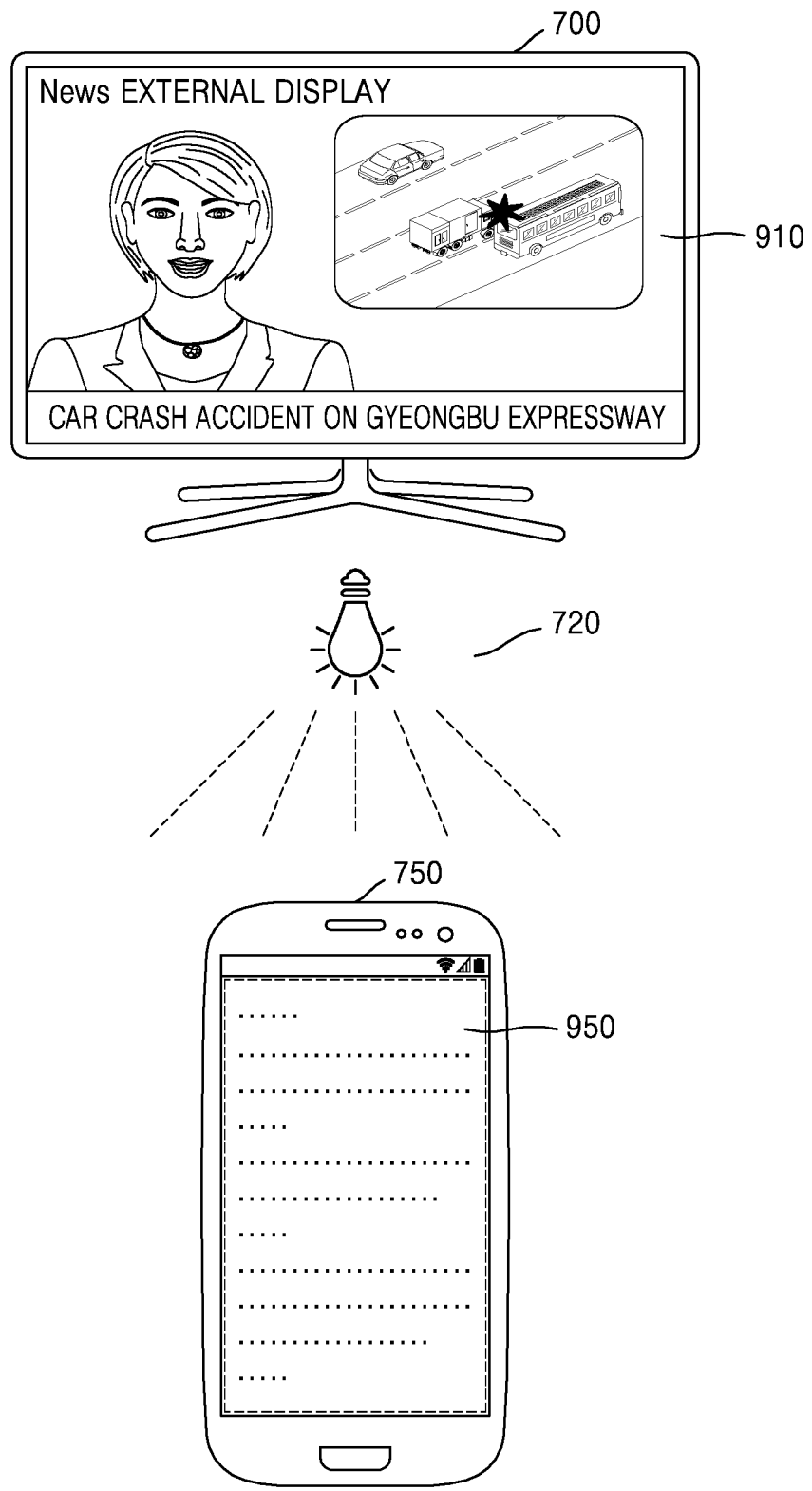
FIG. 9 is another diagram for explaining an operation of obtaining and using network connection information based on VLC data, performed by an electronic apparatus according to an embodiment.

FIG. 9 is another diagram for explaining an operation of obtaining and using network connection information based on VLC data, performed by an electronic apparatus according to an embodiment.

The controller 420 of the electronic apparatus 750 may, based on the obtained network connection information, obtain information associated with content, and may control a screen including the obtained information associated with content to be displayed on the display 430.

Referring to FIG. 9, the external display 700 displays an image 910 corresponding to content. In this regard, the content may include content for providing information to a user. The electronic apparatus 750 may be connected to a server or apparatus for obtaining information associated with content that is displayed, and may obtain additional information, auxiliary information, and/or related information about content. The electronic apparatus 750 may control the additional information, the auxiliary information and/or the related information about content to be displayed.

In the embodiment illustrated in FIG. 9, content may be a news program, and the image 910 may be a news program viewing screen.

The electronic apparatus 750 may obtain network connection information for connecting to a network associated with the news program, which is content.

For example, the electronic apparatus 750 may, based on the first data, for example, VLC data, obtain network connection information for connecting to a broadcasting station server that provides a news program. Then, by using the network connection information, the electronic apparatus 750 may be connected to the corresponding broadcasting station server and obtain information about the news program currently being watched. In an embodiment, the electronic apparatus 750 may, by using network connection information, be connected to a corresponding broadcasting station server and obtain information about the currently watching new program, and then, based on the obtained information about the new program, perform an information search in other internet server to obtain auxiliary information associated with a news event in the news program, which is content.

For example, information about a new program may be information associated with a news event currently being output in the corresponding new program. For example, when the currently output news event is a car accident in a specific area, the electronic apparatus 750 may obtain information about the details of the corresponding news event, a news comment list associated with the corresponding news event, or auxiliary information associated with the corresponding new event, for example, information about traffic congestion in a specific area due to a car accident.

In an embodiment, content may be advertisement content, and the image 910 may be an advertisement screen. In this regard, the electronic apparatus 750 may obtain network connection information associated with a server or apparatus which provides information associated with advertisement content, which is content, information about the target of the advertisement in the advertisement content, etc. In an embodiment, the information associated with advertisement content may be information about where the advertisement content was taken, information about models that appear in the advertisement content, Information about items appearing in the advertisement content, or the like. In an embodiment, regarding the advertisement content, the information about the target of advertisement may be the price of a product, which is the target of advertisement, the place of sale, characteristics of the product, the material or component of the product, or the like. In this case, the electronic apparatus 750 may control the obtained information to be displayed.

Referring to FIG. 9, the electronic apparatus 750 may display a screen 950 including information associated with the obtained content.

Figure 10:
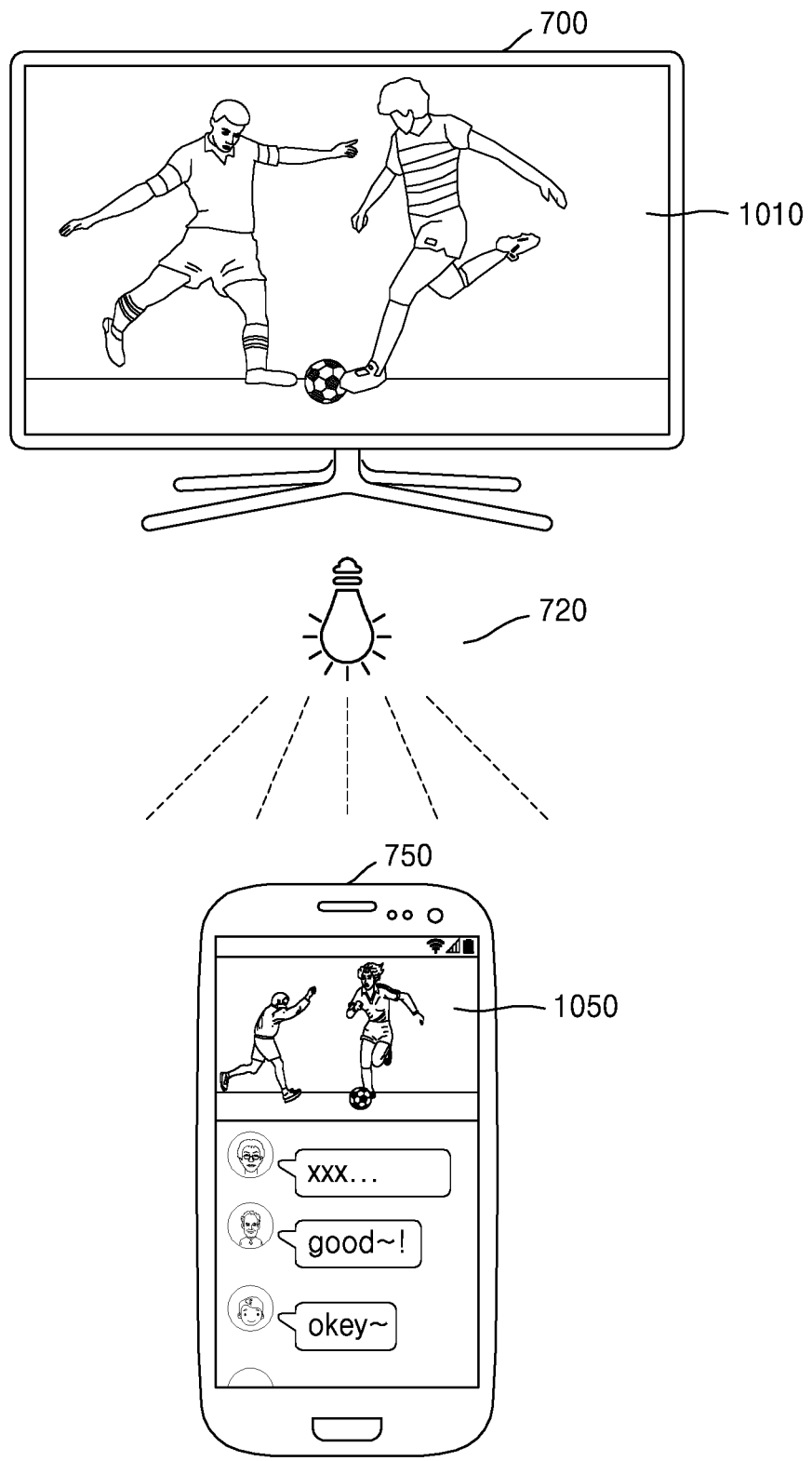
FIG. 10 is another diagram for explaining an operation of obtaining and using network connection information based on VLC data, performed by an electronic apparatus according to an embodiment.

FIG. 10 is another diagram for explaining an operation of obtaining and using network connection information based on VLC data, performed by an electronic apparatus according to an embodiment.

Referring to FIG. 10, an external display 700 displays an image 1010 corresponding to content.

The electronic apparatus 750 receives VLC data transmitted through the VLC 720, and obtains network connection information for connecting to a network associated with content based on the received VLC data.

For example, a network associated with content may be a network corresponding to a chat room or a bulletin board for a plurality of viewers or a plurality of users to start their arguments on the content.

Accordingly, the electronic apparatus 750 may, based on certain network connection information, display a display window 1050 including the chat room or bulletin board for a plurality of viewers or a plurality of users to start their arguments on the content.

In an embodiment, the chat room or bulletin board included in display window 1050 may be a chat room or bulletin board that already exists in relation to content. In an embodiment, the chat room or bulletin board included in display window 1050 may be a chat room or bulletin board that is newly open in the electronic apparatus 750 in relation to content.

Referring to FIG. 10, a case in which the external display 700 is relaying a sporting event is illustrated as an example. In this example, the electronic apparatus 750 may obtain network configuration information for connecting to a chat room for chatting with friends for a sporting event being relayed by the user, and, in response to the obtained network configuration information, display the display window 1050 including the chat room.

Figure 11:
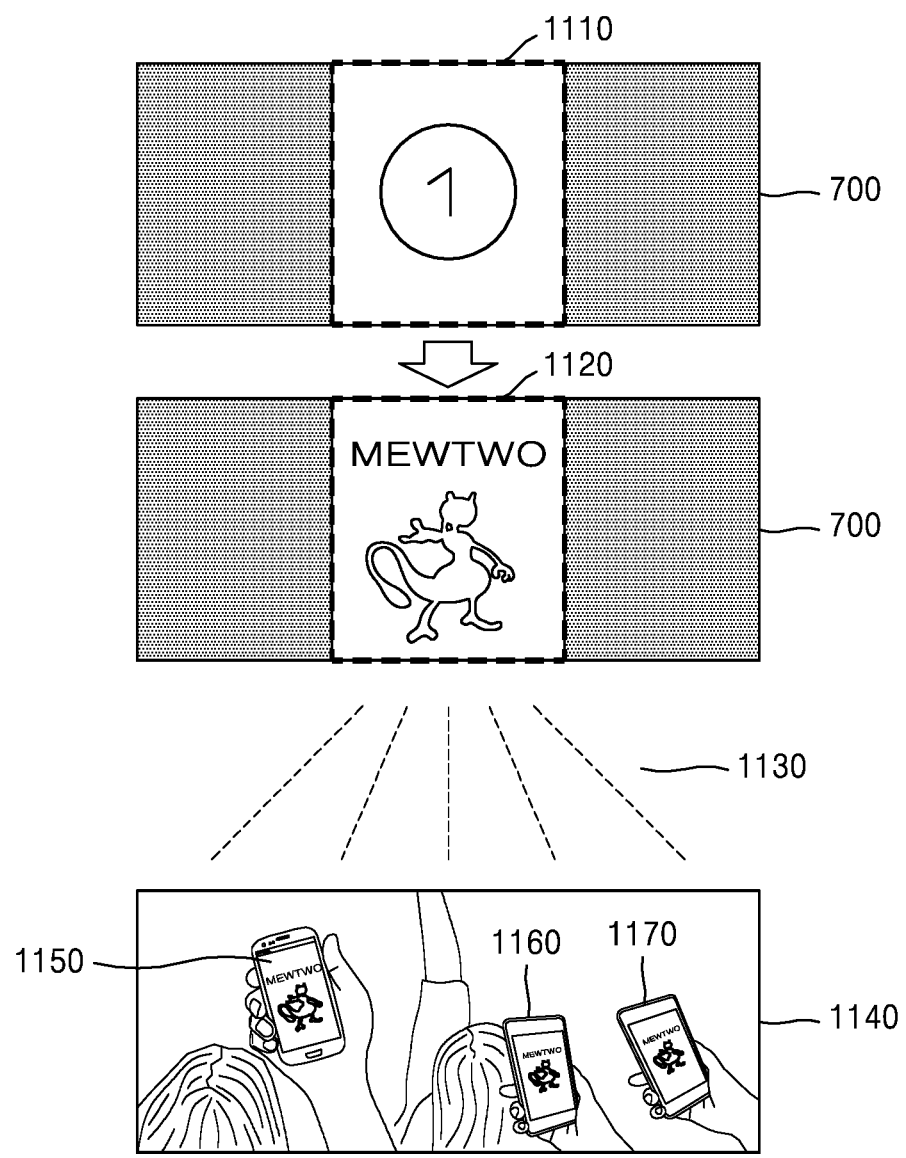
FIG. 11 is a diagram for explaining an operation of sharing and using augmented reality content based on VLC data, performed by an electronic apparatus according to an embodiment.

FIG. 11 is a diagram for explaining an operation of sharing and using augmented reality content based on VLC data, performed by an electronic apparatus according to an embodiment.

Augmented reality (AR) technology is a field of virtual reality (VR), in which a virtual object or information is synthesized into a real environment to make the virtual object or information to look like those that exist in the real environment.

AR content may refer to a game, movie, or image using AR technology, and AR content is continuously developed and distributed.

Referring to FIG. 11, the external display 700 displays an image 1110 corresponding to content. The external display 700 may display an image that changes over time. For example, the external display 700 may output the image 1110 at a certain time and an image 1120 at a following time.

In this regard, content may include AR content. The receiver 410 of the electronic apparatus 400 may receive the VLC data received through a VLC 1130 and obtain network connection information based on the received VLC data. In detail, the controller 420 of the electronic apparatus 400 may, based on the VLC data, obtain network connection information for connecting to a network associated with AR content, and may perform an operation for at least one of the electronic apparatus 400 and an external electronic apparatus to connect to a network by using the obtained network connection information. In an embodiment, the controller 420 may control the obtained network connection information to be transmitted to at least one external electronic apparatus corresponding to at least one user using VR content.

Referring to a screen 1140 illustrated in FIG. 11, the electronic apparatus 400 may transmit network connection information associated with virtual reality content to a plurality of electronic apparatuses, including electronic apparatus 1150, electronic apparatus 1160, and electronic apparatus 1170 corresponding to a plurality of users, the electronic apparatus 1150, electronic apparatus 1160, and electronic apparatus 1170 being connected to the electronic apparatus 400 in a wired/wireless manner. Accordingly, the users of the electronic apparatus 1150, electronic apparatus 1160, and electronic apparatus 1170 may conveniently share and use VR content.

In an embodiment, to share at least one image 1110 or image 1120 corresponding to the content displayed on the external display 700 as AR content, the controller 420 may control information about the location of the electronic apparatus 400 and network connection information to be transmitted to at least one from among external electronic apparatuses including electronic apparatus 1150, electronic apparatus 1160, or electronic apparatus 1170 corresponding to at least one user using AR content.

In an embodiment, the external display 700 illustrated in FIG. 11 may be a digital signage installed in a public place. Hereinafter, the external display 700 may also be referred to as the digital signage 700. When the digital signage 700 installed in the public place outputs an image corresponding to content at a particular time, the digital signage 700 may also output VLC data including information associated with content. Then, the electronic apparatus 400 receives VLC data transmitted by the digital signage 700, and obtains network connection information for connecting to a network associated with content based on the received VLC data. By using the network connection information, the electronic apparatus 400 may use and share a particular image as AR content.

In the related art, GPS system of an electronic apparatus is used to share and use AR content with a plurality of users. In the embodiment, AR content is used and shared by using VLC data. Accordingly, only a target user, for example, a user of an electronic apparatus receiving VLC data may use AR content quickly and conveniently. Also, the selective availability of a target image output by the electronic apparatus 700 as AR content is appropriate for the intention of the use of the electronic apparatus.

Figure 12:
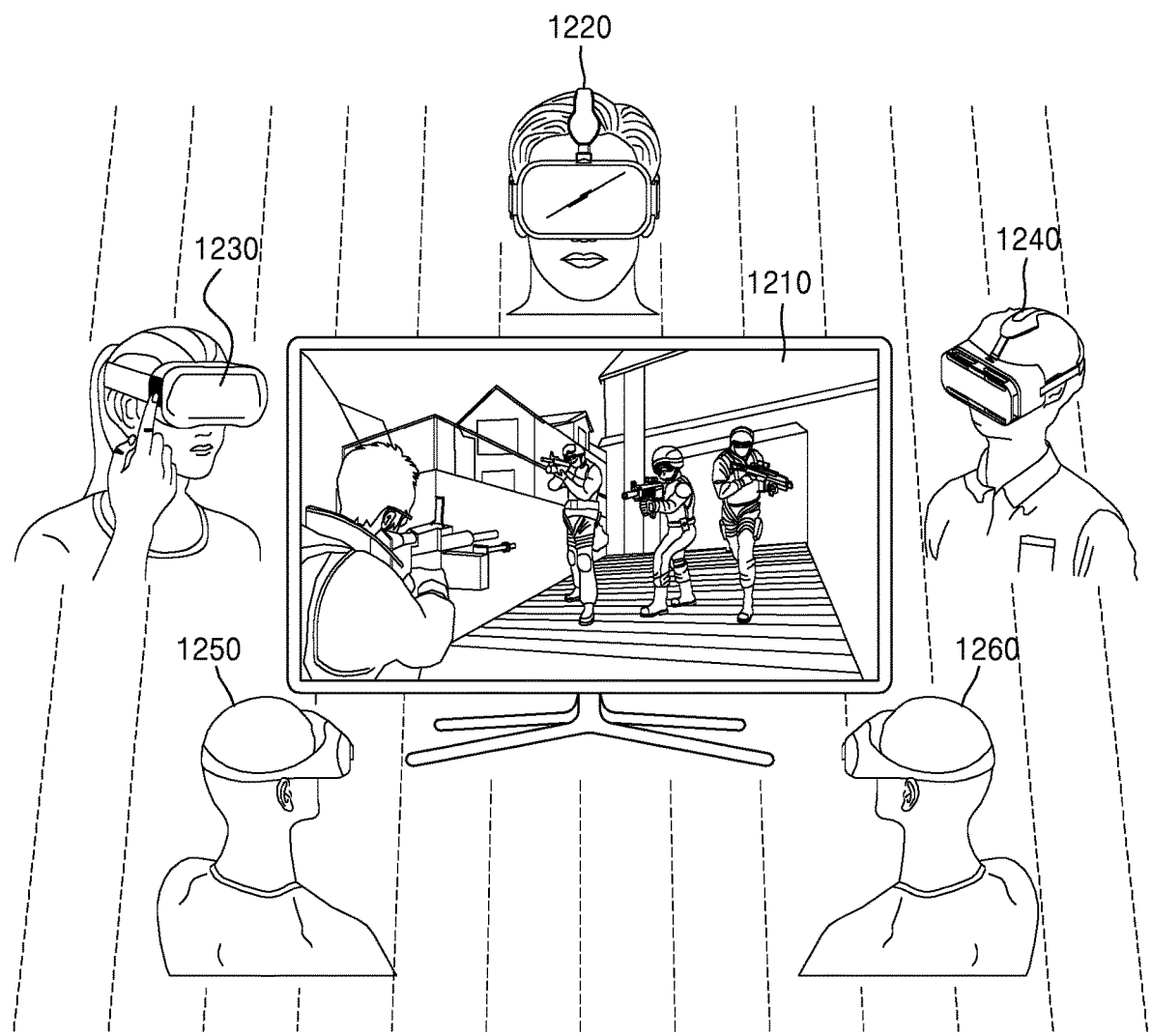
FIG. 12 is a diagram for explaining an operation of sharing and using virtual reality content based on VLC data, performed by an electronic apparatus according to an embodiment.

FIG. 12 is a diagram for explaining an operation of sharing and using virtual reality content based on VLC data, performed by an electronic apparatus according to an embodiment.

VR technology refers to a specific environment or situation, or technology itself, that is created by artificial technology using computers and the like. VR content may refer to a game, movie, or image using such VR technology, and VR content is continuously developed and distributed. Electronic devices dedicated for execution of VR content are being developed.

Such an electronic device dedicated for VR content may be referred to as a VR device. The VR device may be manufactured in the form of a head-mounted display (HMD) device. In the case of the HMD device, a user interface for user input is limited. For example, the head-mounted display device may be controlled by using a small touchpad or a small manipulation key. Accordingly, it requires a plurality of manipulating operations and takes long to manipulate the user interface of the HMD device to connect to a network corresponding to the target content. The electronic apparatus 400 according to an embodiment may obtain and use network connection information associated with content based on VLC data, and accordingly, VR content may be quickly used and shared without complicated manipulation.

Referring to FIG. 12, to share, as VR content, a screen 1210 corresponding to the content output by an external display, for example, the external display 530 of FIG. 5, the electronic apparatus 400 controls network connection information for connecting to a network associated with content to be transmitted to at least one of external electronic apparatus 1220, external electronic apparatus 1230, external electronic apparatus 1240, external electronic apparatus 1250, and external electronic apparatus 1260 corresponding to at least one user using VR content. In an embodiment, the electronic apparatus 400 may display the screen 1210 on the display 430 to use the screen 1210 as VR content by using the obtained network connection information.

In an embodiment, when content output by an external display, for example, external display 530 of FIG. 5, is VR content, the controller 420 may obtain network configuration information associated with content, and may, by using the obtain network configuration information, display content on the display 430 of the electronic apparatus 400. In an embodiment, the electronic apparatus 400 may control the obtained network configuration information to be transmitted to at least one of the external electronic apparatus 1220, external electronic apparatus 1230, external electronic apparatus 1240, external electronic apparatus 1250, and external electronic apparatus 1260 corresponding to at least one user using VR content.

In an embodiment, referring to FIG. 12, when a plurality of users exist in a place where an external display regenerating the screen 1210 exists, each of the external electronic apparatus 1220, external electronic apparatus 1230, external electronic apparatus 1240, external electronic apparatus 1250, and external electronic apparatus 1260 corresponding to the users may directly receive VLC data output through the screen 1210. That is, the electronic apparatus 1220 may receive VLC data through the screen 1210, and based on the received VLC data, may display content corresponding to the screen 1210 on a display included in the electronic apparatus 1220. In an embodiment, the external electronic apparatus 1230 may receive VLC data through the screen 1210, and based on the received VLC data, may display content corresponding to the screen 1210 on a display included in the external electronic apparatus 1230. In an embodiment, the external electronic apparatus 1240 may receive VLC data through the screen 1210, and based on the received VLC data, may display content corresponding to the screen 1210 on a display included in the external electronic apparatus 1240. In an embodiment, the electronic apparatus 1250 may receive VLC data through the screen 1210, and based on the received VLC data, may display content corresponding to the screen 1210 on a display included in the electronic apparatus 1250.

In this manner, the users existing in the place where an external display is located may simultaneously use VR content corresponding to the screen 1210 by using the external electronic apparatus 1220, external electronic apparatus 1230, external electronic apparatus 1240, external electronic apparatus 1250, and external electronic apparatus 1260.

Figure 13:
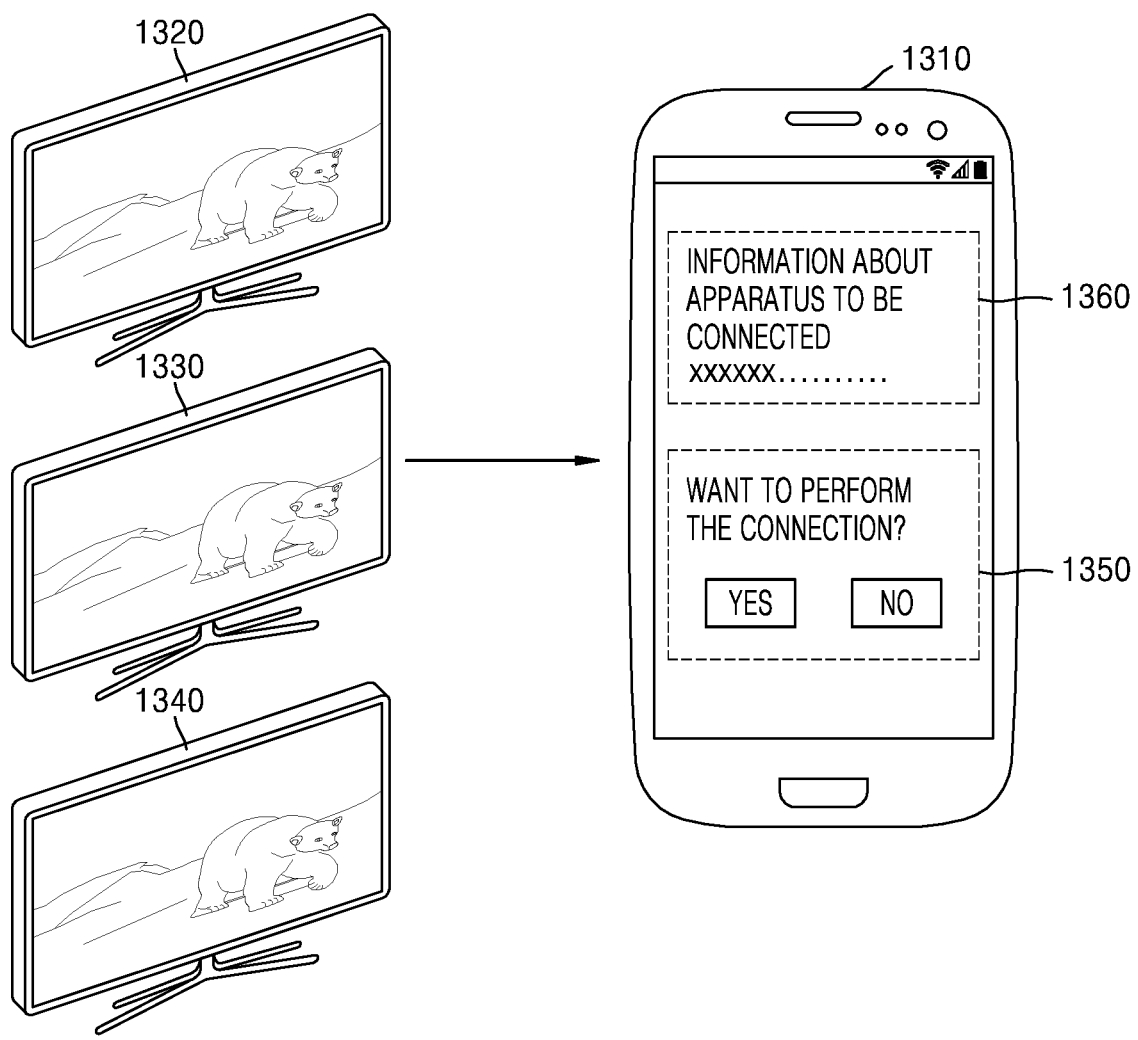
FIG. 13 is a diagram for explaining a pairing operation performed by an electronic apparatus according to an embodiment.

FIG. 13 is a diagram for explaining a pairing operation performed by an electronic apparatus according to an embodiment.

In the embodiment, first data, for example, VLC data, received by the receiver 410 may include identification information to identify an external display. The controller 420 may, based on identification information included in VLC data, control pairing of the electronic apparatus 400 and the external display outputting VLC data to occur.

Referring to FIG. 13, when a plurality of external displays, for example external display 1320, external display 1330, and external display 1340 exist around the electronic apparatus 750, the electronic apparatus 750 may receive VLC data output by any one of external display 1320, external display 1330, and external display 1340, for example external display 1330. The electronic apparatus 750 may easily identify one external display from among the external display 1320, external display 1330, and external display 1340, and may perform pairing with the identified external display.

In an embodiment, the electronic apparatus 750 may allow the receiver 410 included therein to recognize a screen of any one of the external display 1320, external display 1330, and external display 1340, for example external display 1330, thereby obtaining the identification information about the external display 1330 quickly and conveniently. The electronic apparatus 750 may, based on the obtained identification information, display a user interface screen 1310, which is a user interface for performing the pairing operation. Accordingly, the user, by referring to the identification information 1360 included in the user interface screen 1310, may conveniently identify whether the external display 1330 is an external display with which the pairing operation is to be performed. Accordingly, the user of the electronic apparatus 750 may request a pairing connection by using a menu window 1350 for requesting the pairing connection. Then, in response to the received user input, the electronic apparatus 750 may perform the pairing connection with the external display 1330.

Figure 14:
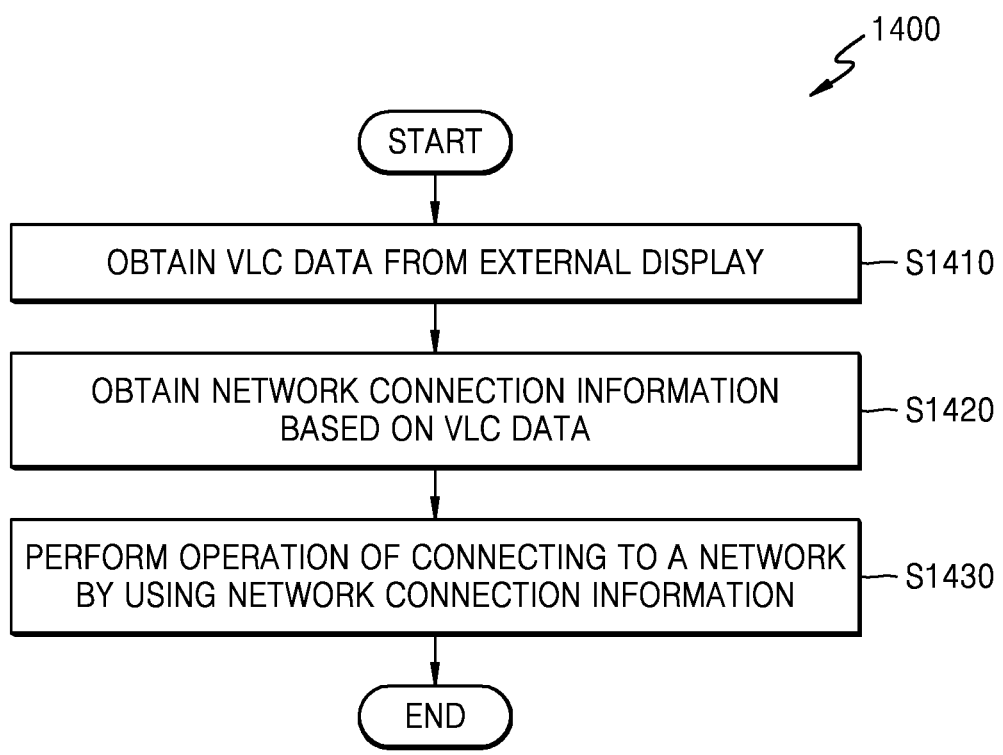
FIG. 14 is a flowchart illustrating a VLC data processing method according to an embodiment.

FIG. 14 is a flowchart illustrating a VLC data processing method according to an embodiment.

A data processing method 1400 according to an embodiment is identical to the operations performed by an electronic apparatus according to an embodiment, for example, electronic apparatus 200, electronic apparatus 300, electronic apparatus 400, electronic apparatus 500, and electronic apparatus 750 Therefore, in describing the data processing method 1400 according to an embodiment, description that had been provided in connection with FIGS. 1 to 13 will be omitted. In an embodiment, the data processing method 1400 will be described in connection with the electronic apparatus 500, the external display 530, and the external electronic apparatus 560, which are illustrated in FIG. 6. The components included in the electronic apparatus 500 will be described in detail with reference to the electronic apparatus 400 illustrated in FIG. 4.

The data processing method 1400 according to an embodiment may be performed by any electronic apparatus that is capable of receiving data through a screen displayed on an external display. In an embodiment, the data processing method 1400 according to an embodiment is a method of processing VLC data, and may be performed by the electronic apparatus 400 or 500 including the receiver 410 including at least one light receiving element that recognizes an image output through visible light.

According to the data processing method 1400, when the external display 530 displays an image corresponding to content, the electronic apparatus 500 obtains first data including information associated with content, which is data output through an image output by the external display 530 at operation S1410. The operation S1410 may be performed in the receiver 410 of the electronic apparatus 400. In this regard, the first data may be VLC data.

Based on the first data received in the operation S1410, network connection information for connecting to a network associated with content may be obtained at operation S1420. The operation S1420 may be performed in the controller 420 of the electronic apparatus 400. In an embodiment, the operation S1420 may be performed in such a way that a processor included in the controller 420 executes at least one instruction.

Subsequently, by using network connection information obtained in operation S1420, an operation is performed in which at least one of the electronic apparatus 500 and the external electronic apparatus 560 is connected to a certain network at operation S1430. The operation S1430 may be performed in the controller 420 of the electronic apparatus 400.

In an embodiment, the operation in which the electronic apparatus 500 is connected to a network in operation S1430 may be similar to the operation S576 and the operation S577 illustrated in FIG. 6. In an embodiment, the operation in which the external electronic apparatus 560 is connected to a network in operation S1430 may be similar to operation S578 and operation S579 illustrated in FIG. 6.

In an embodiment, an example of the operation, in which at least one of the electronic apparatus 500 and external electronic apparatus 560 is connected to a network in operation S1430, may be similar to operations described in the embodiments explained in connection with FIGS. 7 to 13.

In an embodiment, according to the data processing method 1400, at least one of operation S577 in which the electronic apparatus 500 uses content and operation S579 in which the external electronic apparatus 560 uses content, which are described in connection with FIG. 6, may be further performed.

As described above, a method and electronic apparatus for processing data according to an embodiment may, through an image output by an external display, obtain and use network connection information for connecting to a network associated with content, thereby sharing and using the content quickly and conveniently.

In detail, a method and electronic apparatus for processing VLC data according to an embodiment may obtain network connection information based on VLC data, and thus, without complicated manipulation of a user to obtain network connection information, network connection information for using content may be obtained quickly and conveniently.

The above-described embodiments can also be embodied as a recording medium including instruction codes executable by a computer such as a program module executed by the computer. A computer-readable medium can be any recording medium which can be accessed by the computer and includes all volatile/non-volatile and removable/non-removable media. Examples of the computer-readable recording medium include computer storage media and communication media. A computer storage medium includes all volatile/non-volatile and removable/non-removable media embodied by using any method or technology for storage of information, such as computer-readable instructions, data structures, program modules, or other data. Communication media typically includes any information delivery medium, including computer-readable instructions, data structures, program modules, other data of a modulated data signal such as a carrier wave, or other transmission mechanisms. One or more embodiments may be embodied as a computer program including instructions executable by a computer, such as a computer program executed by a computer, or a computer program product.

Any particular implementations described in this disclosure are only an example, and are not intended to limit the scope of the present disclosure in any method. For brevity of description, the description of electronic configurations according to the related art, control systems, software, and other functional aspects of the systems may be omitted.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An electronic apparatus comprising:
   a receiver configured to receive data output through a screen of an external display;
   a memory storing one or more instructions; and
   a controller comprising at least one processor configured to execute the one or more instructions stored in the memory,
   wherein, based on the external display outputting an image corresponding to content, the controller is configured to:
   obtain data that is output through the image, the data comprising first data including information associated with the content,
   obtain network connection information for connecting to a network associated with the content based on the first data,
   control, by using the network connection information, the electronic apparatus to be connected to the network, and
   in response to a user input, which requests the network connection information to be transmitted to an external electronic apparatus that is separate from the external display, and that is not connected to the network, being received, control the network connection information, which is used to connect to the network associated with the content, to be transmitted to the external electronic apparatus,
wherein the electronic apparatus is associated with a first user, and
wherein the external electronic apparatus is associated with a second user different from the first user.

2. The electronic apparatus of claim 1, wherein the first data includes at least one from among connection information about the content, broadcasting information about the content, characteristics information about the content, service information associated with the content, auxiliary information associated with the content, and connection information about the network associated with the content.

3. The electronic apparatus of claim 1, wherein the network connection information comprises information for connecting to a server or apparatus which provides, based on the first data, at least one of the content, a service associated with the content, and information associated with the content.

4. The electronic apparatus of claim 3, further comprising a display,
wherein the controller is further configured to control, by using the network connection information, the content to be displayed on the display.

5. The electronic apparatus of claim 3, further comprising a display,
wherein the controller is further configured to connect, using the network connection information, to the server or the apparatus which provides the service associated with the content, and is further configured to control a display window providing the service to be displayed on a portion of the display.

6. The electronic apparatus of claim 3, further comprising a user interface configured to receive a command or information,
wherein the controller is further configured to:
receive, via the user interface, the user input of requesting sharing, with the external electronic apparatus, at least one of the content, the service associated with the content, and the information associated with content, and
control the network connection information to be transmitted to the external electronic apparatus, in response to the user input.

7. The electronic apparatus of claim 1, wherein the controller is further configured to obtain, based on the network connection information, information associated with content and control a screen including the information associated with content to be displayed on a display.

8. The electronic apparatus of claim 1, further comprising a display,
wherein the content includes an advertisement, and
wherein the controller is further configured to obtain, based on the first data, network connection information for connecting to a server or apparatus to provide information or a service corresponding to the advertisement, and to control a display window to be displayed on the display by using the network connection information, the display window providing the information or the service corresponding to the advertisement.

9. The electronic apparatus of claim 3, wherein the controller is further configured to control the network connection information to be transmitted to the external electronic apparatus corresponding to a user using virtual reality (VR) content, to share at least one screen corresponding to the content as the VR content.

10. The electronic apparatus of claim 3, wherein the content includes VR content, and
wherein the controller is further configured to control the network connection information to be transmitted to at least one external electronic apparatus corresponding to at least one user using the VR content.

11. The electronic apparatus of claim 3, wherein
the controller is further configured to control location information of the electronic apparatus and the network connection information to be transmitted to the external electronic apparatus corresponding to a user using augmented reality (AR) content to share at least one screen corresponding to the content as the AR content.

12. The electronic apparatus of claim 1, wherein the first data includes identification information to identify the external display, and
wherein the controller is further configured to control, based on the identification information, pairing to be performed between the electronic apparatus and the external display.

13. The electronic apparatus of claim 1, wherein the first data comprises visible light communication (VLC) data that is output through a screen of the external display.

14. A data processing method comprising:
based on an external display outputting an image corresponding to content, obtaining, by the external display, information associated with the content that is data output through the image;
obtaining network connection information for connecting to a network associated with the content based on first data included in the data;
performing, by an electronic apparatus, an operation of connecting to the network; and
in response to a user input, which requests the network connection information to be transmitted to an external electronic apparatus that is separate from the external display, and that is not connected to the network, being received, transmitting the network connection information, which is used to connect to the network associated with the content, to the external electronic apparatus,
wherein the electronic apparatus is associated with a first user, and
wherein the external electronic apparatus is associated with a second user different from the first user.

15. The data processing method of claim 14, wherein the network connection information includes information for connecting to a server or apparatus which provides at least one of the content, a service associated with the content, and the information associated with content.

16. The data processing method of claim 15, further comprising
connecting to the server or the apparatus which provides the content by using the network connection information;
receiving data corresponding to the content from the server or apparatus providing the content; and
displaying the content on a display of the electronic apparatus.

17. The data processing method of claim 14, further comprising receiving the user input of requesting sharing at least one of the content, a service associated with the content, and information associated with content with the external electronic apparatus, and transmitting the network connection information to the external electronic apparatus, in response to the user input.

18. The data processing method of claim 14, wherein the operation of connecting to the network comprises transmitting the network connection information to the external electronic apparatus corresponding to a user using virtual reality (VR) content to share at least one screen corresponding to the VR content.

19. The data processing method of claim 14, wherein the operation of connecting to the network comprises transmitting location information of the electronic apparatus and the network connection information to the external electronic apparatus corresponding to a user using augmented reality (AR) content to share at least one screen corresponding to the content as the AR content.

20. The data processing method of claim 14, wherein the first data includes identification information identifying the external display, and the data processing method further comprises performing pairing between the electronic apparatus and the external display based on the identification information.

\* \* \* \* \*